United States Patent
Yamamoto et al.

(10) Patent No.: US 7,245,577 B2
(45) Date of Patent: Jul. 17, 2007

(54) OPTICAL INFORMATION RECORDING APPARATUS AND OPTICAL INFORMATION RECORDING MEDIUM

(75) Inventors: Hiroki Yamamoto, Hitachi (JP); Takashi Naitou, Mito (JP)

(73) Assignee: Hitachi, Ltd., Tokyo (JP)

( * ) Notice: Subject to any disclaimer, the term of this patent is extended or adjusted under 35 U.S.C. 154(b) by 560 days.

(21) Appl. No.: 10/641,097

(22) Filed: Aug. 15, 2003

(65) Prior Publication Data
US 2004/0085882 A1    May 6, 2004

(30) Foreign Application Priority Data
Oct. 30, 2002  (JP)  ............................. 2002-315906

(51) Int. Cl.
G11B 7/24    (2006.01)
(52) U.S. Cl. ............................. 369/275.2; 430/270.13
(58) Field of Classification Search .................... None
See application file for complete search history.

(56) References Cited
U.S. PATENT DOCUMENTS

| | | | |
|---|---|---|---|
| 6,524,766 B1 * | 2/2003 | Ariyoshi et al. | 430/270.13 |
| 6,790,502 B1 | 9/2004 | Yamamoto et al. | |
| 6,826,144 B1 * | 11/2004 | Ichihara et al. | 369/288 |
| 6,844,092 B2 | 1/2005 | Yamamoto et al. | |
| 2001/0015949 A1 * | 8/2001 | Nagase et al. | 369/100 |
| 2003/0134229 A1 * | 7/2003 | Yasuda et al. | 430/270.13 |

FOREIGN PATENT DOCUMENTS

| | | |
|---|---|---|
| EP | 1 223 457 A1 | 7/2002 |
| EP | 1326133 | 7/2003 |
| JP | 06-162564 | 6/1994 |
| JP | 06-267078 | 9/1994 |
| JP | 08-096412 | 4/1996 |
| JP | 10-340482 | 12/1998 |
| JP | 2000-034381 | 2/2000 |
| JP | 2001-084645 | 3/2001 |
| JP | 2001-0093874 | 10/2001 |
| JP | 2001-273679 | 10/2001 |
| WO | WO 01/27689 A1 | 4/2001 |

OTHER PUBLICATIONS

Korean Office Action dated Jan. 19, 2006.
Toshimichi Shintani et al., "A New Super-Resolution Film Applicable to Read-Only and Rewritable Optical Disk", Japanese Journal of Applied Physics, Mar. 1999, pp. 1656-1660, vol. 38, Part 1, No. 3B, 1999 Publication Board of Japanese Journal of Applied Physics, XP-000905975.
Search Report dated Jul. 15, 2005, with partial English translation.
Hiroki Yamamoto, et al., "Nonlinear change of refractive index of Co3O4 thin films induced by semiconductor laser ($\lambda$=405 nm) irradiation" Applied Physics Letters, vol. 81, No. 6, Aug. 5, 2002.

* cited by examiner

Primary Examiner—Wayne Young
Assistant Examiner—Lixi Chow
(74) Attorney, Agent, or Firm—Crowell & Moring LLP

(57) ABSTRACT

An optical information recording medium includes a recording layer for recording optical information, a plurality of laminated layers, and a substrate for supporting those layers, while a beam of a specific wavelength is being radiated, a light absorption peak is shifted to a longer or a shorter wavelength side than the peak located before said beam radiation, realizing a high S/N ratio and a high recording density of the medium.

11 Claims, 16 Drawing Sheets

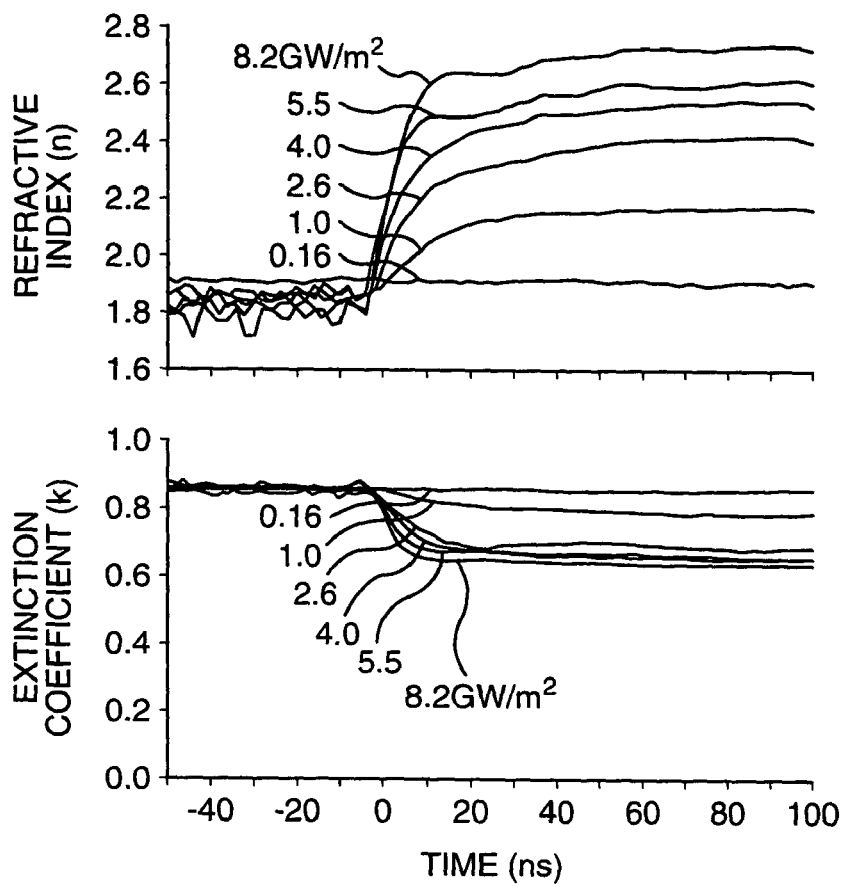
FIG. 3A
FIG. 3B
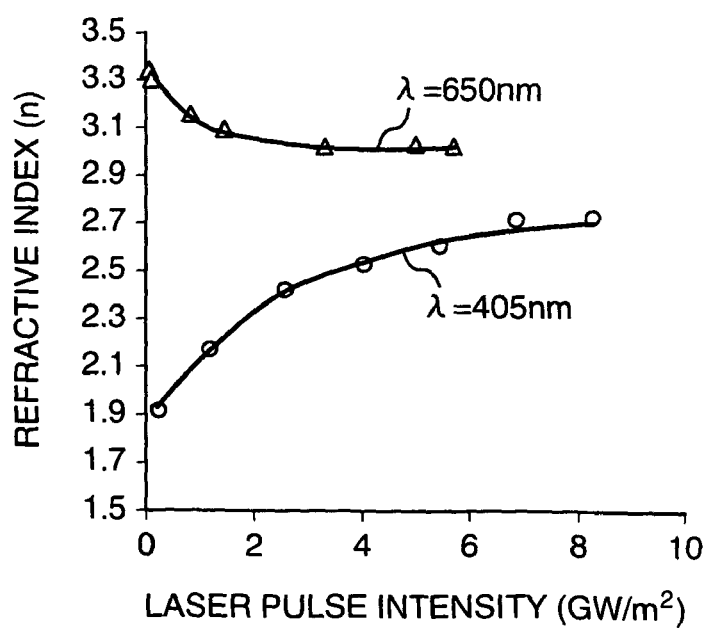
FIG. 4

LASER TRAVELING DIRECTION

LASER TRAVELING DIRECTION

OPTICAL INFORMATION RECORDING APPARATUS AND OPTICAL INFORMATION RECORDING MEDIUM

BACKGROUND OF THE INVENTION

1. Field of the Invention

The present invention relates to an optical information recording apparatus and an optical information recording medium which includes a light-condensing layer.

2. Description of the Related Art

The recent development of an information-oriented society through the optical communication has required a new communication system that provides a capability of rapidly communicating a large volume of information. As an optical device indispensable to developing such a high-volume and fast optical communication, there may be referred an optical information recording medium that condenses a high volume of optical information. Moreover, with digitization of an image such as a TV image or enhancement of an image quality such as the high-definition of a TV image, it is quite pressing to develop a high-volume optical information recording medium that may keep the quality of an image high and record the high-quality image for a long time.

Today, as the optical information recording medium, the DVD (Digital Versatile Disk) having a capacity of 4.7 GB on one side comes into practical use. It is widely utilized for a computer medium or a medium for recording a high-volume moving picture such as a video application. Practically, this kind of DVD may be used as a ROM (DVD-ROM) on which optical information is directly written as well as a rewritable recording and reproducing optical medium. The optical information recording medium has been developed for enhancing the recording density. In order to make the density of the information recording higher, a laser beam of a short wavelength is used. The laser beam has a wavelength of 650 nm that is shorter than the wavelength (780 nm) of the laser beam used for a CD or the like. However, in order to treat a high volume of information such as a computer graphics picture or a digital Hi-vision image, it is necessary to make the recording density four to five times as high as that for the foregoing laser beam of a short wavelength. To achieve it, a new optical disk is now being developed. The new optical disk is fitted into a blue semiconductor laser of a quite short wavelength (405 nm) and may have a volume of 27 GB on one side.

As another technology of enhancing the recording density, formation of a light-condensing layer may be referred. The light-condensing layer is a coating film to be formed on the top or the bottom of an optical recording layer formed on the optical recording medium. This coating film serves to reduce a beam spot of an incident ray passing through or reflected on the film itself, for making the recording density higher. The combination of this technology with the foregoing technology of shortening a laser wavelength makes it possible to increase the volume of the optical disk.

One of the mechanisms for bringing about the light-condensing effect is an absorption-saturation phenomenon. The phenomenon utilizes such a nonlinear optical characteristic that the light-condensing layer serves to pass a ray having a higher intensity than the absorption-saturation amount therethrough and absorb the ray having a lower intensity. The spatial intensity of a laser beam used for reading or writing information is distributed in the Gaussian manner. Hence, when the beam is passed through the light-condensing layer, the base portion of the beam of a lower intensity is absorbed by the light-condensing layer, while the central portion of the beam of a higher intensity is passed through the layer. This makes it possible to reduce the beam in diameter after passed through the layer.

Today, as a component material of this kind of layer, a phthalocyanine system organic film or a chalcogenide system compound may be referred as described in JP-A-8-96412. Also, it is known that the organic material such as a thermochromic material as described in JP-A-6-162564 or a photochromic material as described in JP-A-6-267078 may be used for composing the light-condensing layer.

However, the light-condensing material such as the thermochromic material or the photochromic material raises its extinction coefficient by the heat or the excitation caused by beam radiation, so that the layer composed of such a material may lower its transmittance or reflectance. The resulting laser beam may not reach the required power for reading information from the medium. In order to overcome this shortcoming, in JP-A-2001-273679, an interference layer is laminated on the beam-incident side of a super resolution reproducing film (composed of a light-condensing material) whose extinction coefficient is selectively made higher by the greater beam radiation than the predetermined threshold volume. The interference layer is composed of a layer of a low refractive index and a layer of a high refractive layer. The interference layer serves to increase the reflectance of the beam radiated onto the optical information medium.

The JP-A-2000-34381 describes the optical recording medium having a mask layer whose light transmittance characteristic is varied by the beam radiation. This mask layer is a light-condensing function layer. The JP-A-10-340482 describes a recording medium having a glass layer in which the intensity distributions of the radiated beam and the transmitted beam are varied nonlinearly, for the purpose of improving endurance of an organic film considered as a super resolution film. The super resolution film used herein is a light-condensing function layer.

SUMMARY OF THE INVENTION

However, both of the foregoing arts composed to have the super resolution film have a shortcoming that they have a lower S/N ratio. It is thus an object of the present invention to provide an optical information recording medium having a super resolution film as a component which medium has an improved S/N ratio.

According to an aspect of the invention, an optical information recording medium includes a recording layer for recording optical information, a plurality of laminated layers, and a substrate for supporting them, and during radiation of a laser beam, a light absorption peak in a spectral reflectance curve being shifted to a longer wavelength side or a shorter wavelength side than the peak located before the laser radiation. Further, there is provided an optical information recording apparatus which is arranged to use this optical information recording medium.

Other objects, features and advantages of the invention will become apparent from the following description of the embodiments of the invention taken in conjunction with the accompanying drawings.

BRIEF DESCRIPTION OF THE DRAWINGS

FIGS. 3A and 3B are graphs showing a time change of a refractive index and an extinction coefficient of a laser pulse obtained by the estimating optical system shown in FIG. 2;

FIG. 4 is a graph showing a relation between a refractive index and a laser pulse intensity as to the refractive index shown in FIG. 3;

DETAILED DESCRIPTION OF THE EMBODIMENTS

Figure 1:
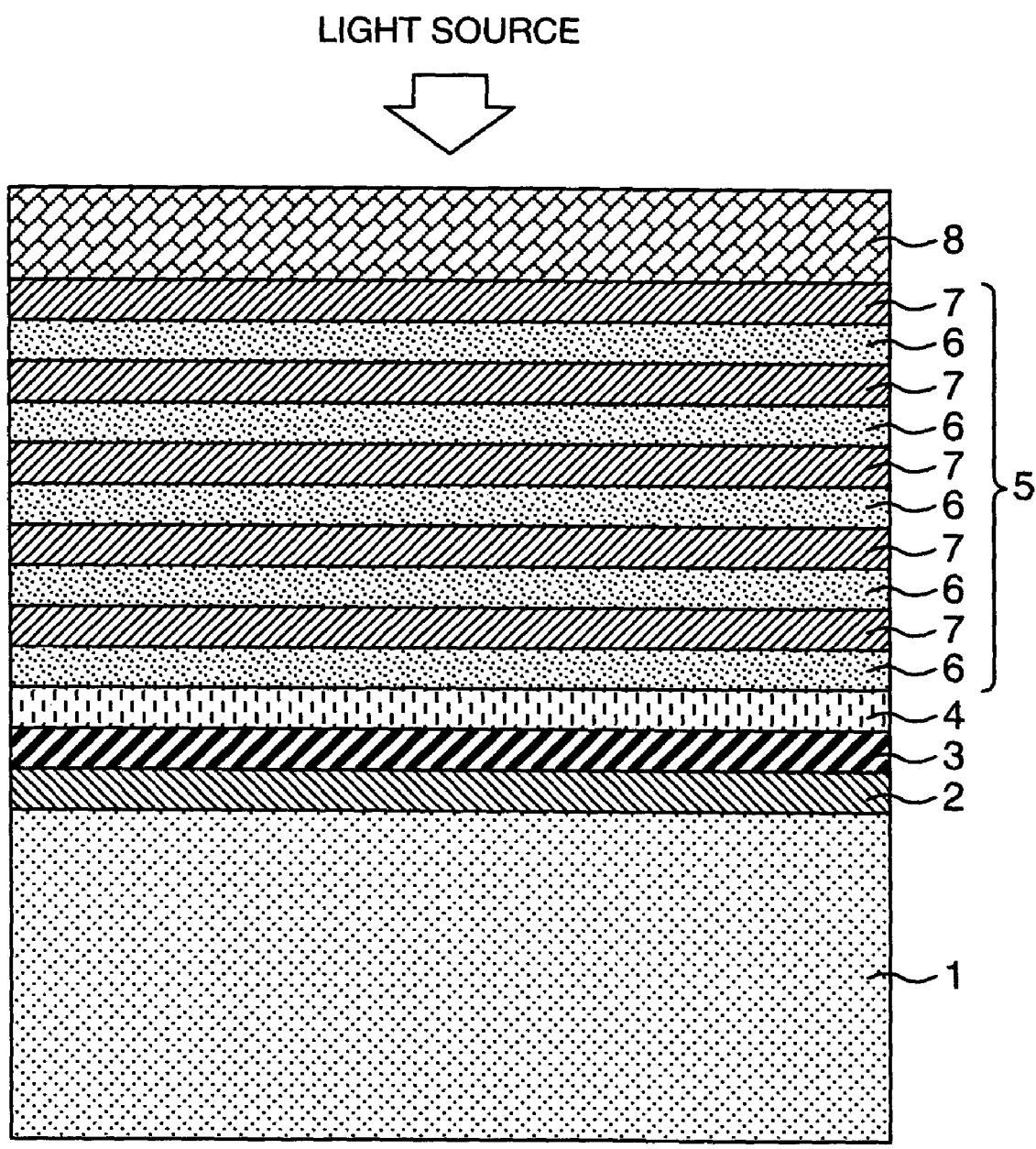
FIG. 1 is a model view showing a section of a RAM disk produced according to an embodiment of the present invention.

Prior to describing the embodiments, the present invention will be explained briefly with reference to FIG. 1. The optical information recording medium is composed of a recording layer for recording optical information on its substrate directly or through another layer and a plurality of laminated layers composed by laminating a combination of one dielectric layer 1 and the other dielectric layer 2 n (n=2 to 30) cycles (times). These layers 1 and 2 are formed on the top or the bottom of the recording layer directly or through another layer. The refractive index of each of these dielectric layers 1 and 2 is raised or lowered reversibly to the rise of the intensity of a laser beam radiated for reading or writing the optical information. The extinction coefficient of each layer 1 or 2 is also lowered reversibly to the rise of the intensity of the radiated laser beam. It is preferable that the repetitive cycles may be more than four cycles, in particular, ten cycles or more.

Further, this optical information recording medium is composed of the foregoing light recording layer, two combinations of laminated layers, one combination being composed by laminating one dielectric layer 2 and the other dielectric layer 3 n (n=2 to 30) cycles (times) and the other combination being composed by laminating them m (m=2 to 30) cycles (times), and another dielectric layer 1 formed between these two combinations of laminated layers. The refractive index of this dielectric layer 1 is raised or lowered reversibly to the rise of the intensity of the laser beam radiated for reading or writing the optical information. The extinction coefficient thereof is lowered reversibly to the rise of the intensity of the radiated laser beam.

The product of the thickness of the dielectric layer 1, the dielectric layer 2, or the dielectric layer 3 composing the optical information recording medium and the refractive index measured by the laser beam having an intensity of 0.16 GW/m$^2$ or lower is made 0.15 to 0.35 time as large as the laser wavelength. That is, the product is about one-quarter wavelength of the radiated beam.

The dielectric layer 1 includes the first dielectric film that is served to diminish or lower its extinction coefficient if the radiated beam has a more light volume or intensity than a certain threshold value. The extinction coefficient corresponds to an imaginary portion of a refractive index and is proportional to the absorption coefficient. As the material has a greater extinction coefficient, the material is more somber.

As a preferable material of the dielectric layer 1 is used an oxide or a sulfide of a transition metal selected from a group consisting of cobalt, ferrum, nickel, vanadium, manganese, chromium, cadmium, copper, silver, platinum, and gold. Or, the film composed of glass having one or more transition metal particles dispersed therein may be used as the layer 1 as well. The dielectric layer 2 or 3 includes oxide, nitride, and sulfide that contain silicon and zinc. Preferably, the dielectric layer 1 is composed of $Co_3O_4$ and the dielectric layer 2 is composed of a material selected from a group consisting of $SiO_2$, ZnS—$SiO_2$, and $Si_3N_4$. The first to the third dielectrics, 208, 206, 207 shown in FIG. 20, respectively, have their respective refractive indexes to the radiated beam. The optical recording layer of the optical information recording medium is composed of read-only pits or grooves formed on the substrate or is an information rewritable layer formed on the substrate directly or through another layer.

A preferable information recording medium according to the present invention includes a recording layer for recording optical information, a plurality of laminated layers, and a substrate for supporting the recording layer and the plurality of laminated layers. While the laser beam is radiating, the light absorption peak in the spectral reflectance curve is shifted to the longer wavelength side or the shorter wavelength side than the light absorption peak located before the laser beam is radiated. It is preferable that the rising angle of the absorption peak is 60 degrees or more. The acute peak rising characteristic of the spectral reflectance curve causes the information recording medium to have a high S/N ratio.

Hereafter, the present invention will be described in detail along the embodiments.

First Embodiment

FIG. 1 shows a sectional composition of the optical information recording having a rewritable RAM structure produced according to the present invention. In FIG. 1, a numeral 1 denotes a substrate. A numeral 2 denotes a reflective layer. A numeral 3 denotes a protective layer. A numeral 4 denotes a recording layer. A numeral 5 denotes a light-condensing layer. The light-condensing layer 5 is composed of repetitive combinations of dielectric layers 6 and 7. A numeral 8 denotes a cover layer. A laser beam used for reading and writing information is entered from the cover layer 8, passed through each layer and reflected on each layer boundary, and finally reflected on the reflective layer 2. The reflected laser beam enters into an optical detector (not shown). According to the present invention, the substrate 1 is composed of polycarbonate and has a thickness of 1.1 mm and a diameter of 120 mm. The substrate chuck holes each inner diameter of which is 15 mmφ are formed. The reflective layer 2 is composed of an alloy of Al—3% Ti. The layer 2 has a thickness of 50 nm. Further, the protective layer 3 is composed of a material of 80ZnS-20SiO$_2$ (mol ratio). The layer 3 has a thickness of 70 nm. The recording layer 4 is composed of 10Ge-70Sb-20Te (mol ratio). The thickness of the recording layer 4 is 20 nm. For forming the light-condensing layer 5, the dielectric layer 6 is composed of Co$_3$O$_4$ and has a thickness of 70 nm and the dielectric layer 7 is composed of 80ZnS-20SiO$_2$ (mol ratio) and a thickness of 70 nm. In this embodiment, the light-condensing layer 5 is five cycles of these dielectric layers 6 and 7. Herein, one cycle means one film layer formed of one pair of dielectric layers 6 and 7. Hence, the five cycles means the lamination of five dielectric layers 6 and five dielectric layers 7 sandwiched alternately, that is, the lamination of ten layers in total. Further, the polycarbonate sheet whose thickness is 0.1 mm was pasted on the cover layer 8 by means of ultraviolet curing resin. This pasting was executed by uniformly spin-coating the ultraviolet curing resin on the film-formed polycarbonate substrate, placing a polycarbonate sheet having the same inner and outer peripheral diameters as this substrate in a manner to make the sheet exactly overlapped on the substrate, and radiating a ultraviolet ray from a UV lamp located at the top for curing the resin.

The layers 2 to 7 are formed by means of the sputtering technique. The reflective layer 2 is formed by the DC magnetron sputtering technique. The layers 3 to 7 are formed by means of the RF magnetron sputtering technique. The sputter gas is argon gas and the gas pressure is about 0.7 Pa. Each layer is formed by rotating the substrate on its axis and moving the substrate around as applying a power of 0.2 to 1 kW onto a target of 152.4 mmφ in inner diameter.

Figure 16:
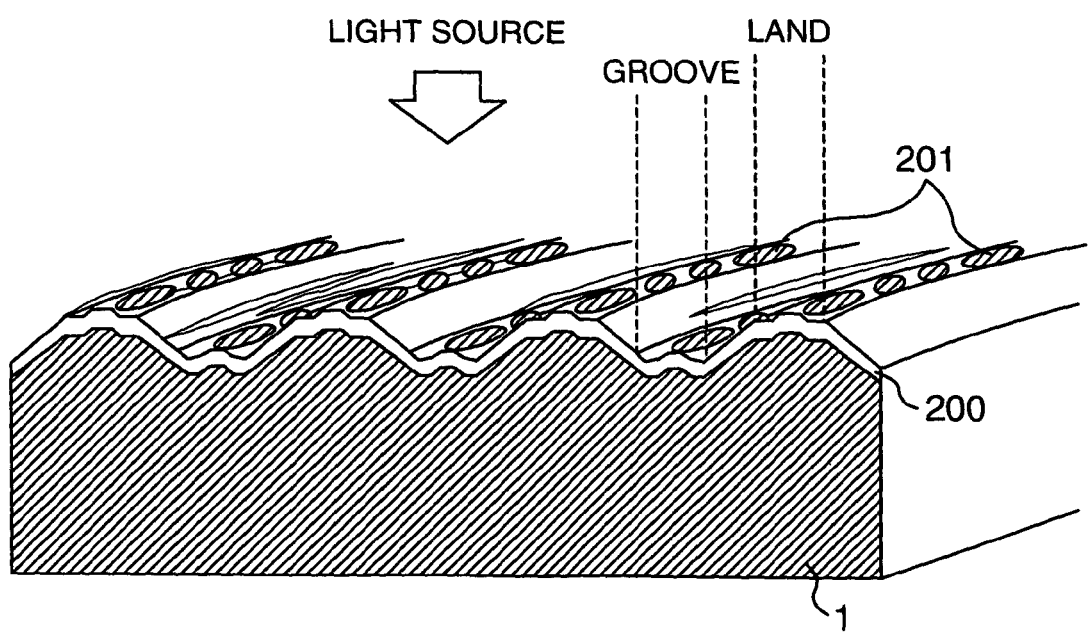
FIG. 16 is a sectional perspective view showing a RAM and a ROM disks produced according to an embodiment of the present invention.

FIG. 16 shows a sectional perspective view showing the optical disk. In FIG. 16, a numeral 1 denotes a substrate. A numeral 200 denotes a plurality of laminated layers 2 to 8 shown in FIG. 1. A numeral 201 denotes a recording pattern recorded with information. As shown in FIG. 16, the optical disk studied in this embodiment includes a land-groove structure, in which information is recorded on both the land portions and the groove portions.

By radiating a semiconductor laser with a wavelength of 405 nm onto the film-formed side as focusing the laser through a condensing lens whose numerical aperture is 0.8, the optical information is recorded, reproduced, and erased for the purpose of estimating the characteristic of the optical disk.

The light-condensing layer composed of a plurality of laminated layers having a periodic structure of the dielectric layers 6 and 7 whose refractive indexes and extinction coefficients are respective to each other as shown by 5 in FIG. 1 is called one-dimensional photonic crystal or a dielectric multi-layered film. In the optical disk according to the present invention, in this light-condensing layer, the dielectric layer 6 serves to change its refractive index and extinction coefficient reversibly according to the intensity of the radiated laser beam or a more intensity thereof than a predetermined threshold value.

Figure 2:
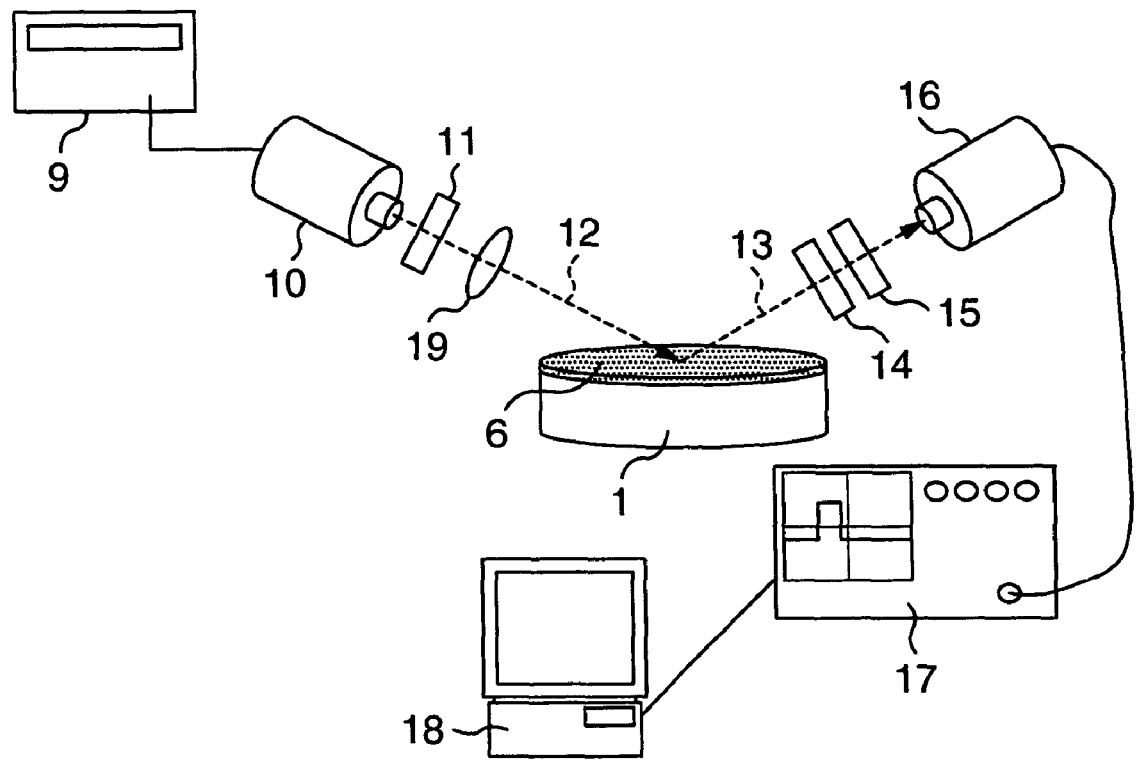
FIG. 2 is a model view showing an optical system for estimating a nonlinear optical film according to the present invention.

At first, the film of the dielectric layer 6 was formed on a tabular glass substrate and the refractive index was changed by radiating the laser beam thereon. FIG. 2 is a model view showing an ellipsometer used for measuring a change of the refractive index or an extinction coefficient. In FIG. 2, a numeral 1 denotes a substrate. A numeral 6 denotes a dielectric layer. A numeral 9 denotes a pulse generator. A numeral 10 denotes a light source. A numeral 11 denotes a polarizer. A numeral 12 denotes an incident beam. A numeral 13 denotes a reflected beam. A numeral 14 denotes an analyzer. A numeral 15 denotes a filter. A numeral 16 denotes a light receiver. A numeral 17 denotes a digital oscilloscope. A numeral 18 denotes a control computer. A numeral 19 denotes a focal lens. As the light source 10 was used a semiconductor laser having a wavelengths of 650 nm and 405 nm. This laser beam was adjusted into the pulse beam having a desirous intensity and time intervals through the effect of the pulse generator 9. The adjusted pulse beam was polarized through the effect of the polarizer so that the vibrating plane of the beam was made to be a parallel (s-polarized) beam and a vertical (p-polarized) beam to the surface of a test sample. Further, the laser beam was focused on the surface of the test sample through the focal lens 19. If the wavelength is 650 nm, the laser diameter of the light-condensing portion was 0.9 µm, while if the wavelength is 405 nm, it was 0.6 µm.

By radiating the polarized beam onto the test sample, the reflectances and the phases of the s-polarized beam and the p-polarized beam are made different according to the film thickness, the refractive index, and the extinction coefficient of the test material. Hence, by measuring the film thickness in advance and deriving the ratio of the reflectance of the s-polarized beam to the p-polarized beam and the phases thereof, it is possible to estimate the refractive index and the extinction coefficient. Herein, the real portion of the refractive index represented in a complex number indicates a refractive index (n), while the imaginary part thereof indicates the extinction coefficient (k), in which k is a parameter about a light absorption coefficient of the material and is a physical quantity with no unit, which is proportional to the absorption coefficient.

By placing the analyzer 14 on the reflected-beam receiving side and rotating the analyzer, the ratio of the reflectance of the s-polarized beam to the p-polarized beam and the phase thereof were derived from the reflected light volume obtained at each angle of the analyzer. The angle of the analyzer was derived by dividing one rotation of the analyzer by 12. Further, since the light receiver disables to analyze the beam properly when the incident light includes a more light volume than an allowable volume, the filter 15 for the intensity of each pulse beam was installed for adjusting the reflected light volume to be entered into the light receiver through the effect of the filter itself.

To measure the reflected beam, the light introduced into the light receiver 16 was divided at regular intervals of 2 ns by the oscilloscope 17 and then the divided light was measured at the regular intervals. The oscilloscope 17 divides the beam at regular intervals of 2ns and measures the divided beam. 50 ns earlier (−50 ns) than the incidence of the pulse beam, the measurement was started, and the measurement was continued for an interval of 100 ns from the occurrence of the pulse. Further, one measurement cannot achieve so high a C/N ratio because of the variety of the laser or the light receiver 16 and the electric noises. One measurement cannot reach an accurate one. Hence, 128 times of measurements were summed up and its average value was derived. The refractive index appearing before the radiation of the laser beam was derived as an average value of the refractive indexes between −50 ns and 0 ns or an average value of the refractive indexes between −50 ns and 100 ns appearing when the pulse beam is not radiated. Further, the refractive index in the radiation of the laser beam was derived as an average value of the refractive indexes measured between 50 ns and 100 ns after the rise of the pulse.

FIGS. 3A and 3B show the changes of the refractive index and the extinction coefficient to a laser intensity of the dielectric layer 6 formed of $Co_3O_4$. The data is described in the Applied Physics Letters, volume 81, sixth issue, 999 to 1001 pages, issued on Aug. 5, 2002. The laser wavelength is 405 nm. In FIGS. 3A and 3B, an axis of abscissa denotes a time, when the laser pulse rises at a time point 0. The light intensity appearing when no laser pulse is generated was 0.16 $GW/m^2$. The refractive index was 1.9. The rise of the laser pulse intensity led to an abrupt rise of the refractive index. When the laser pulse intensity was 8.2 $GW/m^2$, the refractive index was 2.7 and its variation reached 42%. The refractive index provided when the laser beam intensity was 1.0 $GW/m^2$ was about 2.1. It indicates that a change of the refractive index was about 10.5%. The extinction coefficient was changed from 0.85 to 0.65 according to the change of the laser intensity. That is, it indicates that the extinction coefficient was lowered by about 24%. It is estimated that the response to the change of this refractive index is one nanosecond or lower as considered from the rising speed of the laser intensity at the rise of the pulse in FIG. 2.

Figure 5:
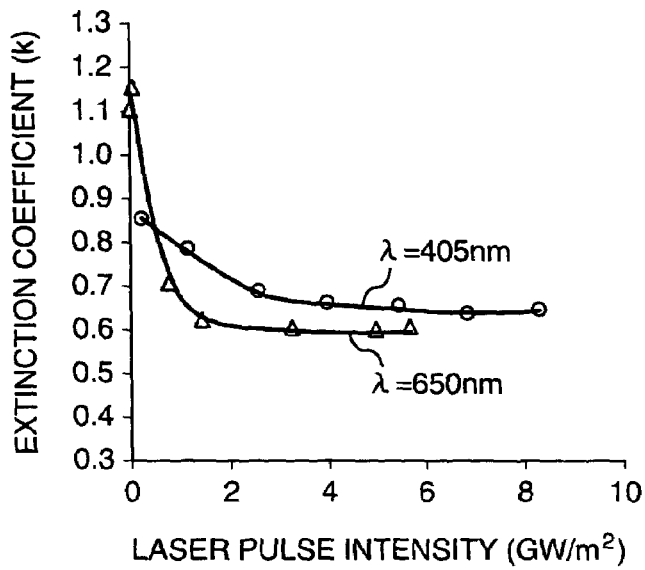
FIG. 5 is a graph showing a relation between an extinction coefficient and a laser pulse intensity as to the refractive index shown in FIG. 3.

The relation between the laser pulse intensity and the refractive index is shown in FIG. 4. The relation between the laser pulse intensity and the extinction coefficient is shown in FIG. 5. FIGS. 4 and 5 also show the results of the similar measurements to FIGS. 3A and 3B about the red laser of a wavelength of 650 nm through the use of the device shown in FIG. 2. For the blue laser of a wavelength of 405 nm, as described with reference to FIGS. 3A and 3B, the refractive index was raised from 1.9 to 2.7, while for the red laser of a wavelength of 650 nm, the refractive index was lowered from 3.3 to 3.0. On the other hand, the extinction coefficient was lowered from 0.85 to 0.65 for the wavelength of 405 nm, while it was also lowered from 1.15 to 0.6 for the wavelength of 650 nm.

As shown in FIG. 5, for any of those wavelengths, the light-condensing layer used in this invention lowered its extinction coefficient. Further, as shown in FIG. 4, the refractive index was raised for the blue laser of a wavelength of 405 nm, while it was lowered for the red laser of a wavelength of 650 nm.

Figure 18:
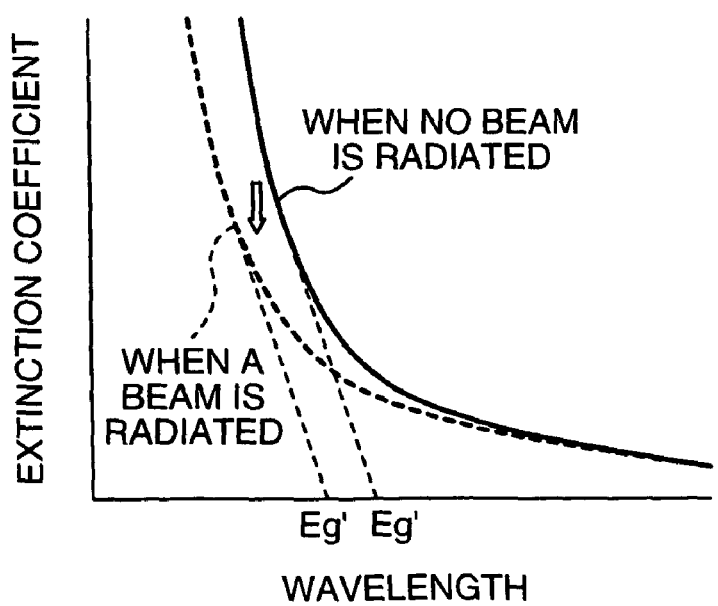
FIG. 18 is a graph showing dependency of a wavelength on an extinction coefficient of the light-condensing layer used in the present invention.
Figure 19:
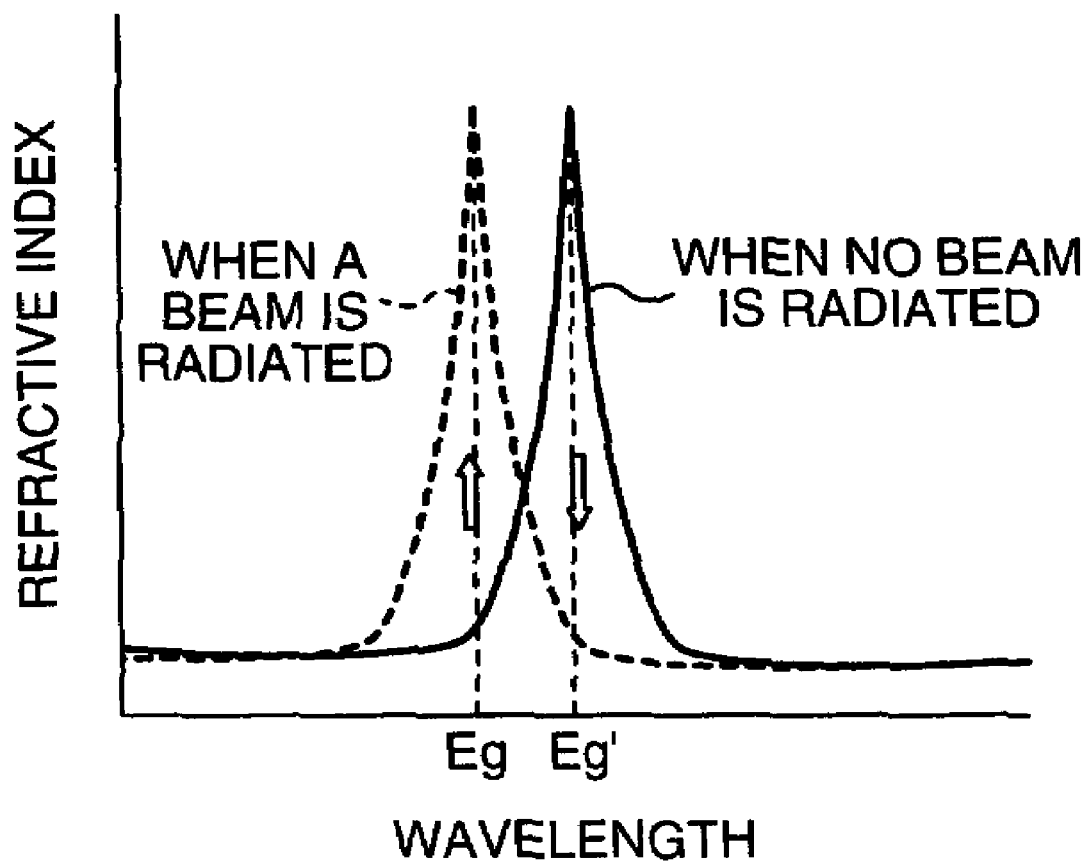
FIG. 19 is a graph showing dependency of a wavelength on a refractive index of the light-condensing layer used in the present invention.

In the foregoing references, the foregoing change of the refractive index of this material is brought about by the mechanism called a band-filling phenomenon. FIGS. 18 and 19 are explanatory views for the band-filling phenomenon. FIG. 18 shows dependency of the extinction coefficient on a wavelength, while FIG. 19 shows dependency of the refractive index on a wavelength. The film formed of $Co_3O_4$ used in this embodiment includes an optical band gap having an energy corresponding to the wavelength of just 650 nm. Hence, in the case of radiating a beam of a shorter wavelength than that, that is, higher energy, the electrons located at the place corresponding to this band gap serve to absorb the light, so that those electrons may be excited. As shown in FIG. 18, therefore, the beam of a longer wavelength has a smaller extinction coefficient, while the beam with a shorter wavelength has a greater extinction coefficient.

When the electrons are excited, the exciting state is shifted from the electrons with more energy to those with less energy. In this case, the electrons with less energy are excited to have more energy than the electrons excited in the beginning. That is, it is grasped that the energy of the band gap is higher than that of the electrons excited in the beginning. Hence, since the beam of a long wavelength but low energy is not absorbed, the absorption coefficient of the light, that is, the extinction coefficient is made lower. This tendency takes place over all wavelengths. It means that the extinction coefficient is made lower with respect to all wavelengths. Since the beam of less energy is not absorbed, it is understood that the light absorption is generally shifted to the shorter wavelength side.

On the other hand, as shown in FIG. 19, the refractive index is calculated by using the Kramers-Kronig relation of the extinction coefficient. The energy in the band gap reaches an energy peak. The dependency of the wavelength on the refractive index is shifted similarly with the shift of the extinction coefficient to the short wavelength side. As a result, it is understood that the refractive index is made lower around the band gap, while the refractive index is raised conversely in the area with a shorter wavelength than that of the band gap. That is, the change of the refractive index brought about by the band-filling phenomenon makes the extinction coefficient lower over all the wavelengths and the refractive index higher or lower according to the wavelength by radiating a highly intensive laser beam.

The optical characteristic of the light-condensing layer 5 (see FIG. 1) was estimated. The light-condensing layer is produced by laminating the dielectric layers whose refractive indexes are changed by radiating the laser beam. The estimation was executed as below. At first, the same plurality of laminated layers as those shown in FIG. 11 was formed on the optical disk substrate having a flat plane called a mirror surface with no concave and convex such as the land-groove structure and the recording pits as shown in FIG. 16. The laser beam of a wavelength of 405 nm was vertically entered into the mirror surface of the optical disk and then the reflected light volume was measured by means of a pickup unit. The reflected light volume against the incident light volume was measured. From the result shown in FIG. 4, the refractive index of the dielectric layer 6 against each incident light volume was derived. Then, from the derived refractive index, the change of the reflected light volume against the refractive index of the dielectric layer 6 was derived. The method of forming the film or the method of producing the optical disk is the same as the foregoing method of producing the optical disk as shown in FIG. 1.

Figure 6:
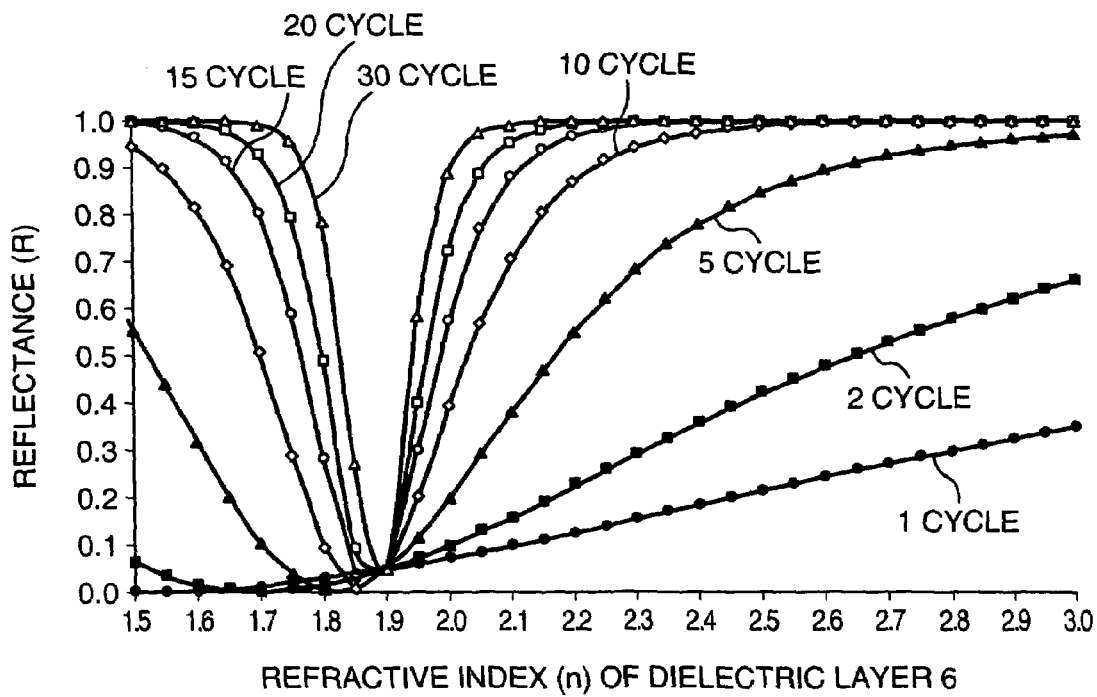
FIG. 6 is a graph showing a relation between a change of a refractive index of a dielectric layer and a change of a reflective index brought about when changing the number of cycles of the dielectric layer composing a light-condensing layer.

FIG. 6 shows the reflectance of the laser beam of a wavelength of 405 nm against the refractive index of the dielectric layer 6 in the change of the laminating cycles of the dielectric layers 6 and 7. In this study, the laminating cycles were changed into 1 to 30 cycles. The thickness of the dielectric layer 6 or 7 was adjusted so that the product of the thickness and the refractive index was made 0.25 time as large as the laser wavelength of 405 nm. When an intensive layer beam is not radiated on the $Co_3O_4$ layer, the refractive index of the $Co_3O_4$ layer is 1.9. Hence, the thickness of the dielectric layer 6 was made to be 53.3 nm. Further, since the refractive index is 2.3, the thickness of the dielectric layer 7 was made to be 44.0 nm.

As shown in FIG. 6, in a case that the laminating cycle is one, when the refractive index of the dielectric layer 6 is 1.9, the reflectance of the light-condensing layer 5 might be made as small as 0.05. Then, when the refractive index of this dielectric layer 6 is changed into 2.7, the reflectance was raised to 0.27. In a case that the laminating cycle is 2, the reflectance was changed from 0.05 to 0.52. It indicates that a greater ratio of the reflectance was obtained as compared with the ratio in the case of one cycle. Hence, only the rise of the laminating cycle from one to two cycles resulted in greatly changing the reflectance in the same change of the refractive index. Consider the increase of the cycles in number. In the ten cycles, the change of the refractive index from 1.9 to 2.2 allowed the reflectance to be greatly changed from about 0.05 to about 0.92. As shown in FIG. 6, it was understood that more laminating cycles leads to the great change of the reflectance even if the change of the refractive index of the dielectric layer 6 is small. Hence, it is preferable that the number of the laminating cycles is five or more, in particular, ten or more.

Figure 7:
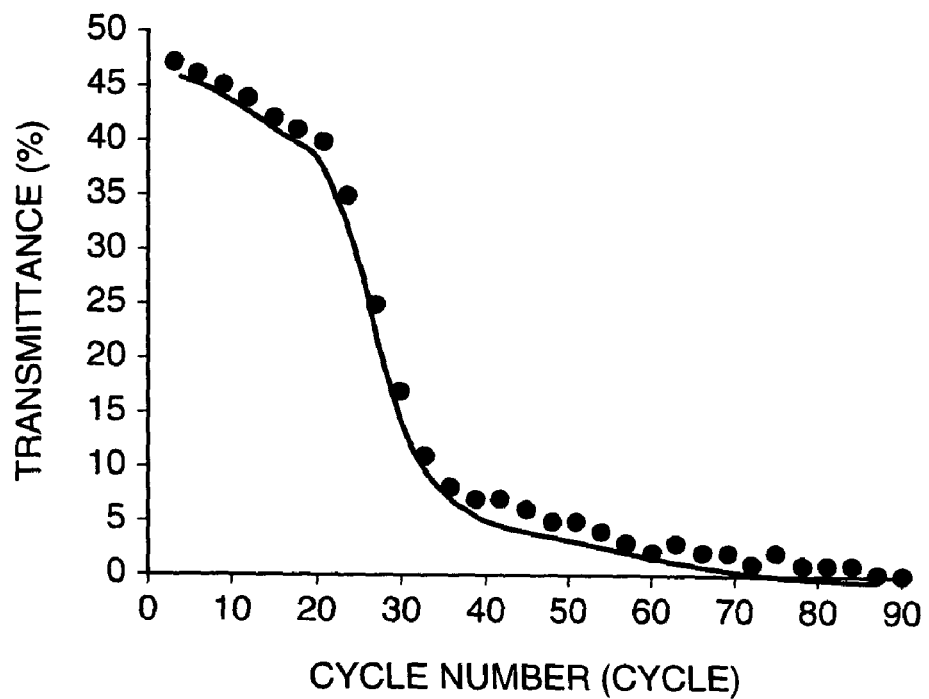
FIG. 7 is a graph showing a change of a transmissive factor brought about when changing the number of cycles of the dielectric layer composing the light-condensing layer.

Next, the change of the transmittance taking place in changing the cycle number of the light-condensing layer composed of the laminated film was estimated. FIG. 7 shows the transmittance against the number of cycles. As viewed from the change of the transmittance, it was understood that with the rise of the number of cycles, the thickness of the layer is made thicker and thus the transmittance of the layer is made smaller. It was also understood that when the number of cycles surpasses 30, the transmittance is made abruptly small. It means that it is preferable to keep the number of the cycles 30 or less.

Further, if the number of the cycles is small, the reflectance may not be raised. If the number of the cycles is 5 or more, a greater change of the reflectance was obtained by the change of the refractive index of the dielectric layer 6. Hence, it is preferable that the number of the cycles is 5 to 30.

Figure 8:
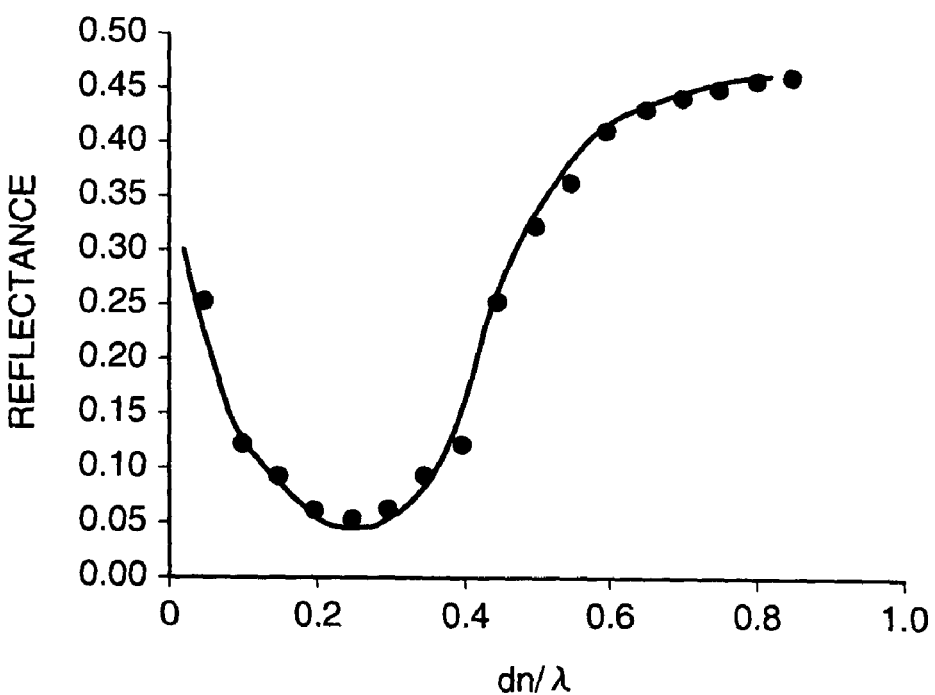
FIG. 8 is a graph showing a change of a refractive index brought about when changing dn/λ of the dielectric layer.

Then, the change of the reflectance brought about by the variation of the thickness of the dielectric layer 6 or 7 was studied. FIG. 8 shows the change of the reflectance against the thickness of the dielectric layer 6 or 7 when the number of the cycles is 5. In FIG. 8, an axis of abscissa denotes a ratio ($dn/\lambda$) of a product of a thickness (d) and a refractive index to a wavelength ($\lambda$). When $dn/\lambda$ is 0.25, the reflectance might be reduced to about 0.05. If $dn/\lambda$ is shifted out of 0.25, the reflectance was increased. As a result, the change of the refractive index did not lead to the great change of the reflectance. It is not preferable. As viewed in FIG. 8, if $dn/\lambda$ is 0.15 to 0.35 in the dielectric layer 6 or 7, the reflectance was 0.10 or lower. It is preferable. On the other hand, if $dn/\lambda$ is less than 0.15 or more than 0.35, the reflectance overpassed 0.10. Hence, the change of the reflectance was not made so great. It is not preferable. It is understood from these results that $dn/\lambda$ is preferably in the range of 0.15 to 0.35 in the thickness of the dielectric layer 6 or 7.

Next, as the material of the dielectric layer 6, several oxides were studied. Table 1 lists the change of the refractive indexes and the change of the reflectances of the light-condensing layer 5 produced by using the dielectric layer 6 studied in this present invention. The laser wavelength was 405 nm, the intensity was 1.0 GW/m$^2$, the dielectric layer 7 was composed of $80ZnS-20SiO_2$ (mol ratio) and its thickness was 44.0 nm, the dielectric layer 6 was adjusted to keep a value of $dn/\lambda=0.25$, and the number of the laminating cycles was five.

TABLE 1

| No. | Dielectric Layer | $n_1$ | $k_1$ | $R_1$ | $n_2$ | $k_2$ | $R_2$ | $\Delta n$ (%) | $\Delta k$ (%) | $\Delta R$ | Estimate |
|---|---|---|---|---|---|---|---|---|---|---|---|
| Test Sample 1 | $Co_3O_4$ | 1.91 | 0.86 | 0.05 | 2.10 | 0.65 | 0.90 | 9.95 | −24.42 | 0.85 | A |
| Test Sample 2 | $Fe_3O_4$ | 2.24 | 0.82 | 0.02 | 2.40 | 0.71 | 0.60 | 7.14 | −13.41 | 0.58 | B |
| Test Sample 3 | $Fe_2O_3$ | 2.05 | 0.50 | 0.04 | 2.21 | 0.42 | 0.55 | 7.80 | −16.00 | 0.51 | B |
| Test Sample 4 | NiO | 1.82 | 0.81 | 0.06 | 1.95 | 0.66 | 0.52 | 7.14 | −18.52 | 0.46 | B |
| Test Sample 5 | $V_2O_5$ | 1.73 | 0.21 | 0.06 | 1.88 | 0.10 | 0.65 | 8.67 | −52.38 | 0.59 | B |
| Test Sample 6 | $Cr_2O_3$ | 1.95 | 0.41 | 0.08 | 2.12 | 0.33 | 0.68 | 8.72 | −19.51 | 0.60 | B |
| Test Sample 7 | $MnO_2$ | 2.13 | 0.52 | 0.08 | 2.34 | 0.41 | 0.75 | 9.86 | −21.15 | 0.67 | B |
| Test Sample 8 | CdS | 2.22 | 0.84 | 0.10 | 2.42 | 0.61 | 0.71 | 9.01 | −27.38 | 0.61 | B |
| Test Sample 9 | Au—$SiO_2$ | 2.06 | 0.44 | 0.05 | 2.21 | 0.32 | 0.53 | 7.28 | −27.27 | 0.48 | B |
| Test Sample 10 | Ag—$SiO_2$ | 2.34 | 0.45 | 0.06 | 2.51 | 0.34 | 0.54 | 7.26 | −24.44 | 0.48 | B |
| Test Sample 11 | Cu—$SiO_2$ | 2.12 | 0.35 | 0.06 | 2.27 | 0.28 | 0.51 | 7.08 | −20.00 | 0.45 | B |

TABLE 1-continued

| No. | Dielectric Layer | $n_1$ | $k_1$ | $R_1$ | $n_2$ | $k_2$ | $R_2$ | Δn (%) | Δk (%) | ΔR | Estimate |
|---|---|---|---|---|---|---|---|---|---|---|---|
| Comparative Reference 1 | $SiO_2$ | 1.46 | 0.01 | 0.06 | 1.48 | 0.01 | 0.07 | 1.37 | 0.00 | 0.01 | C |
| Comparative Reference 2 | CuCl | 2.30 | 0.10 | 0.25 | 2.30 | 0.50 | 0.12 | 0.00 | 400.00 | −0.13 | C |

In Table 1, $n_1$, $k_1$, and $R_1$ denote the refractive index, the extinction coefficient, and the reflectance measured at a laser intensity of 0.16 GW/m², respectively. $n_2$, $k_2$, and $R_2$ denote the refractive index, the extinction coefficient, and the reflectance measured at a laser intensity of 1.0 GW/m², respectively. The variation Δn of the refractive index and the variation Δk of the extinction coefficient were derived by the following expressions, respectively.

$$\Delta n = (n_2 - n_1)/n_1 \times 100$$

$$\Delta k = (k_2 - k_1)/k_1 \times 100$$

The difference ΔR between both of the reflectances was derived by the expression of:

$$\Delta R = R_2 - R_1$$

In the estimation column, if the difference ΔR of the reflectance is 0.7 or more, a score of A was given, if it is 0.4 or more but less than 0.7, a score of B was given, and if it is less than 0.4, a score of C was given.

The test samples Nos. 1 to 8 listed in Table 1 indicate the change of the refractive index brought about by the change of an absorption resulting from the electron excitation. All of these test samples serve to lower their extinction coefficients. The test samples Nos. 1 to 7 are the estimated results of the light-condensing layer 5 having a film composed of transition metal oxide as the dielectric layer 6. The test sample No. 8 is the estimated result of the light-condensing layer 5 having a film composed of cadmium sulfide as the dielectric layer 6. The test samples Nos. 9 to 11 are the estimated results of the light-condensing layer 5 having as the dielectric layer 6 a film formed of $SiO_2$ glass having gold, silver and copper particles dispersed therein. As a comparative reference example are indicated the light-condensing layer 5 having a film composed of $SiO_2$ as the dielectric layer 6 and the light-condensing layer 5 having as the dielectric layer 6 a film composed of CuCl that is the photochromic material whose extinction coefficient is increased.

In the case of using as the test sample No. 1 of the Table 1 $Co_3O_4$ that is cobalt oxide, a quite excellent result was obtained. Concretely, the variations of the refractive index and the extinction coefficient indicate large variations, respectively, and the difference of the reflectance is 0.85. In the test samples Nos. 2 to 11 in which the film is composed of glass having oxide, CdS and metallic particles dispersed therein, the variation Δn of the refractive index was about 7 to 9% and the difference of the reflectance was 0.45 to 0.67. In the case of the reference 1 in which $SiO_2$ is used as the dielectric layer 6, if the intensity of the laser beam is changed, its refractive index and extinction coefficient were hardly changed and its difference of the reflectance was as low as 0.01. In the case of the comparative reference 2 in which CuCl is used as the dielectric layer 6, its refractive index was hardly changed and its extinction coefficient was raised from 0.1 to 0.5. In this case, since the reflectance was lowered by 0.13, the result was not excellent.

As described above, in the case of producing the laminating structure with the material whose extinction coefficient is diminishing, the great change of the reflectance was obtained without lowering the reflectance. As the material with a great difference of the reflectance, cobalt oxide ($Co_3O_4$) was the most preferable. Further, it is understood that oxides of ferrum, nickel, vanadium, chromium and manganese and cadmium sulfide were preferable as well. For $SiO_2$, the refractive index was hardly changed. It was not excellent. Therefore, as a material of the dielectric layer that is one component of the light-condensing layer, the preferable material was the transition metal oxide or sulfide selected from a group consisting of the oxides or sulfides of cobalt, ferrum, nickel, vanadium, chromium and manganese or cadmium. The most preferable material was the cobalt oxide ($Co_3O_4$), which indicated a very large difference of the reflectance.

Second Embodiment

Next, the estimation was executed with respect to the recording and reproducing characteristic of fine pits formed on the optical disk of the RAM structure having the foregoing light-condensing layer loaded thereon, as shown in FIGS. 1 to 16.

Figure 9:
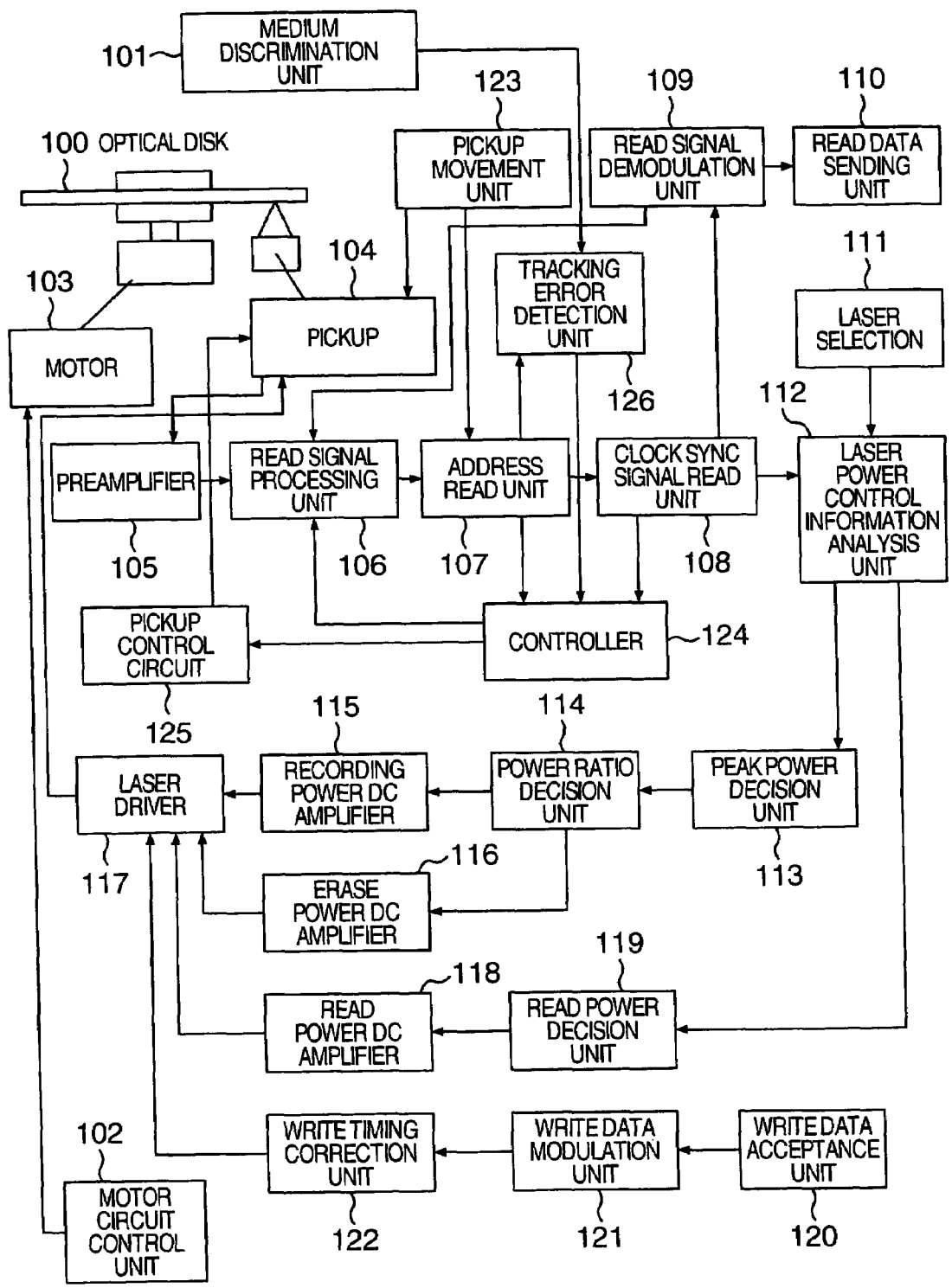
FIG. 9 is a conceptual diagram showing an optical disk reproducing apparatus produced according to the present invention.

FIG. 9 is a block diagram showing an optical information recording and reproducing apparatus used in this embodiment. This apparatus includes a medium discrimination unit 101 for discriminating a type of an optical disk as an optical storage medium. The optical disk 100 is temporarily fixed to a rotation mechanism directly or indirectly connected with a rotary shaft of a motor 103 controlled by a motor circuit control unit 102. A sensing unit, which senses a laser beam emitted from a light source located in an optical pickup 104 and the reflected beam, reads the information on an optical disk 100 as an optical signal. The light source located in the optical pickup 104 applies the laser beam for recording information on the optical disk 100. The optical pickup 104 is positioned in the tracking direction by a pickup movement unit 123.

An optical signal is passed through a preamplifier 105, a read signal processing unit 106, an address read unit 107, and a clock synchronous signal read unit 108 and reaches a read signal demodulation unit 109, from which the optical signal is outputted outside by means of a read data sending unit 110. The reproduced data is outputted by means of the predetermined output means such as a display unit or a speaker or is processed by means of an information processing apparatus such as a personal computer.

In this embodiment, in addition to a circuit system used for ordinary recording and reproduction, a laser selection unit 111 is provided which may select any laser wavelength. Based on the output of the laser selection unit 111, a peak power used in a peak power decision unit 113 is determined in accordance with the analyzed result of the laser power control information analysis unit 112. Likewise, a reading power is also determined by a read power decision unit 119.

The output of the peak power decision unit 113 is passed through a power ratio decision unit 114, a recording power dc amplifier 115, and an erase power dc amplifier 116 and then reaches a laser driver 117 by which the light source located in the optical pickup is controlled. Likewise, the output of a read power decision unit 119 is applied into the laser driver 117 through a read power dc amplifier 118. The laser driver 117 controls the light source located in the optical pickup. The actual laser is a semiconductor laser provided with the wavelengths of 650 nm and 405 nm.

This apparatus has an auto-focusing mechanism that adjusts the focus according to the selected laser beam because each wavelength has the corresponding focal point or focal depth. Further, the light-condensing layer 5 is formed on the disk. As the tracking width is made thinner and thinner, the high density recording detector included in a tracking error detection unit 126 is provided so that the tracking may be executed for any kind of medium. The information of this tracking error detection unit 126 is conveyed to the optical pickup through a controller 124 and a pickup control circuit 125. Further, a medium type discrimination mechanism is provided. This mechanism is operated by using the difference of the reflectance of each medium. The mechanism allows the auto-tracking to be executed according to each type of medium.

In recording data, the data is inputted from a write data acceptance unit 120 and then is modulated by a write data modulation unit 121. The modulated data is inputted into the laser driver 117 through a write timing correction unit 122. Based on the data, the laser driver 117 controls the light source located in the pickup 104.

The arrangement as shown in FIG. 9 makes it possible to use any type of optical recording medium with the corresponding wavelength compatibly as well as to treat any type of disk with the corresponding recording volume in one apparatus. Today, the volume of the disk is increasing more. The arrangement of the optical information recording and reproducing apparatus may be modulated properly according to its purpose of way of use.

In this embodiment, the $Co_3O_4$ film was used as the dielectric layer 6 whose refractive index is changing. As a comparative reference sample, the optical disk with no light-condensing layer 5 was produced and estimated in a similar manner.

Figure 10:
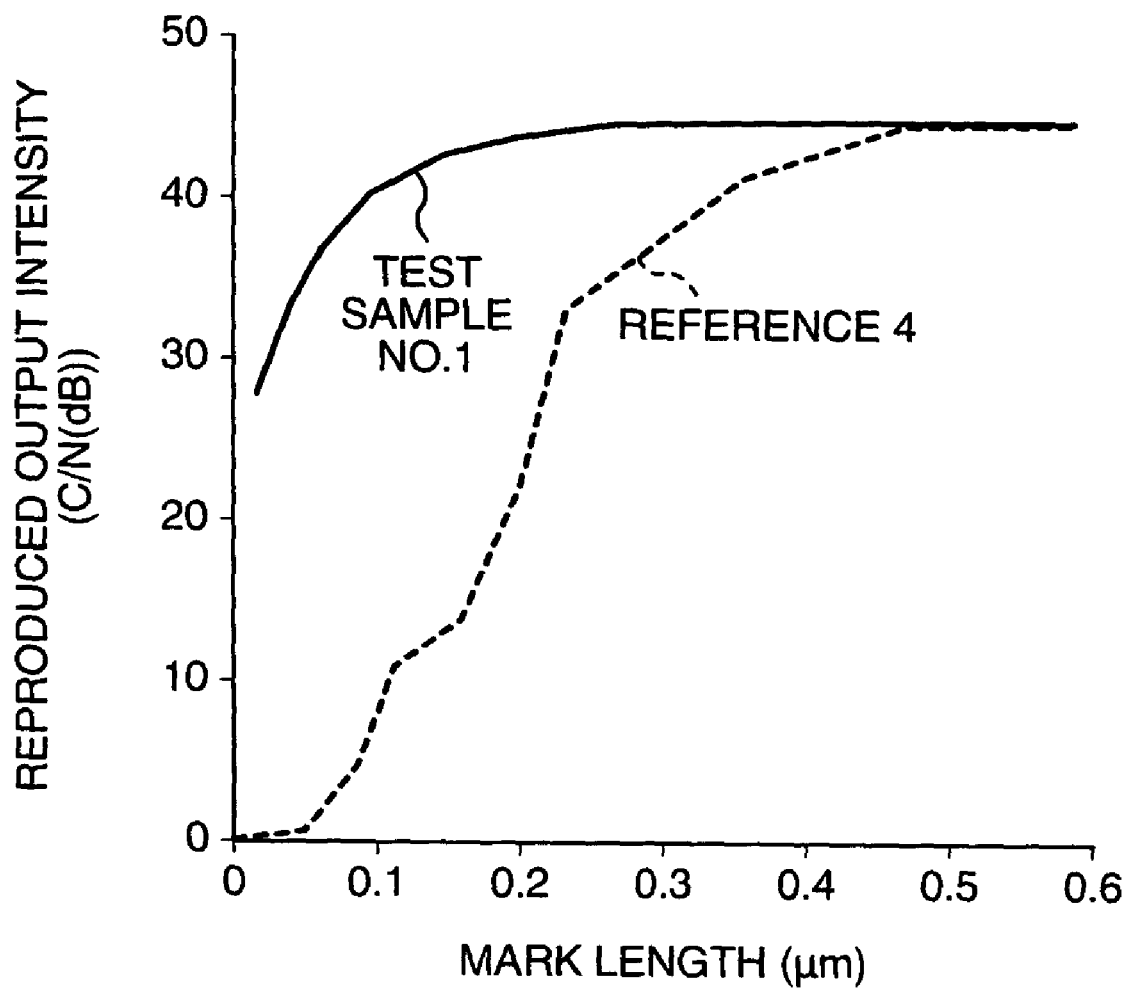
FIG. 10 is a graph showing a change of a C/N ratio to a mark length in the presence or absence of the light-condensing layer of the optical disk according to the present invention.

FIG. 10 shows a length (mark length) of the recording bit to a reproduced output intensity (S/N ratio) in a RAM disk having regularly spaced and equally shaped recording bits produced thereon. The reading laser wavelength is 405 nm and the laser power is 0.5 mW. It was understood that the optical recording medium of this embodiment with the light-condensing layer 5 formed therein has a higher reproducing output to a shorter mark length than the comparative reference medium with no light-condensing layer. In a case of forming the light-condensing layer 5, it was understood that the reproduction can be performed for the shorter mark length. Hence, the light-condensing effect on the RAM disk was assured.

For the light-condensing layer 5 having its dielectric layer formed of each material described in the sample tests Nos. 1 to 11 listed in Table 1, the same light-condensing effect as the foregoing case was assured. However, for the comparative reference medium 1 with the dielectric layer formed of $SiO_2$, the foregoing light-condensing effect was not assured.

Third Embodiment

Figure 11:
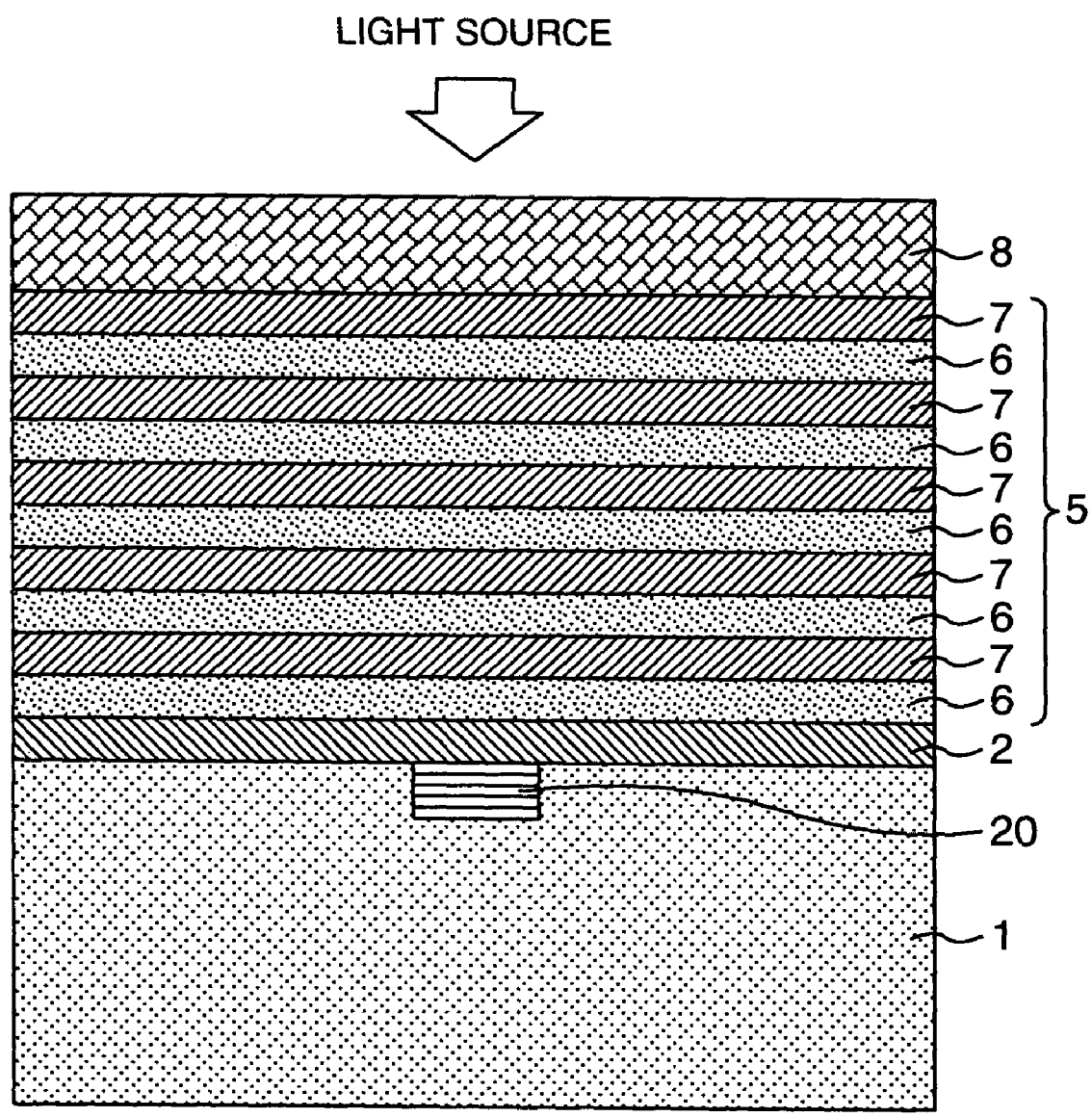
FIG. 11 is a model view showing a section of a ROM disk produced according to an embodiment of the present invention.

In turn, the ROM disk was produced and the light-condensing effect of the ROM disk was checked in the presence or the absence of the light-condensing layer 5. FIG. 11 is a schematic view showing a section of the ROM disk produced according to the present invention. In FIG. 11, a numeral 1 denotes a substrate. A numeral 2 denotes a reflective film. A numeral 5 denotes a light-condensing layer composed of repetitive combinations of dielectric layers 6 and 7. A numeral 8 denotes a cover layer. A numeral 20 denotes an information pit formed on the substrate. The substrate 1 is composed of polycarbonate, polyolefine, or glass, each of which is used according to the specification. This embodiment uses the substrate composed of polycarbonate. Like the RAM disk, the ROM disk produced in this embodiment includes a land-groove structured tracking form as shown in FIG. 16. Information is written on any track of the ROM disk.

The ROM disk was produced along the following process. At first, a pit pattern with information was formed on photo-resist by using a laser beam. Then, the pit pattern was copied on an Ni die. Polycarbonate was injected and molded on this die, for forming the substrate. On this substrate was formed a reflective film 2 in the thickness of 50 nm. The substrate 1 has a thickness of 1.1 mm and the cover layer has a thickness of 1.1 mm. The method of forming a film and a cover layer shown in FIG. 11 is the same as the method in the case of producing the RAM disk shown in FIG. 1.

In this embodiment, the light-condensing layer 5 was formed to have a film of the test samples Nos. 1 to 11 as its dielectric layer 6. Then, the light-condensing characteristic of this layer 5 was estimated. Further, as the comparative reference medium, the light-condensing layer 6 was formed to have a film formed of $SiO_2$ listed in the comparative reference example 1 listed in Table 1 as the dielectric layer 6 or no light-condensing layer was formed in the medium.

The composition of the light-condensing layer formed in the produced optical disk and the reproducing output characteristic of the low-frequency component (2 MHz) and the high-frequency component (10 MHz) was checked as varying the reading power in the range of 1 mW, 2 mW, 3 mW, and 4 mW, and the light-condensing characteristic thereof was estimated. The estimated result of the light-condensing characteristic is listed in Table 2. Herein, the light-condensing characteristic means a phenomenon that the lower recording bits than a diffraction limit defined by a light wavelength may be read out at a high output. The laser beam used for reading information is a semiconductor laser of a wavelength of 405 nm.

TABLE 2

| | No. | Dielectric Layer 6 in Light-condensing Layer 2 | Output (dB) 2MHz | | | | Output (dB) 10MHz | | | | Super Resolution Effect |
|---|---|---|---|---|---|---|---|---|---|---|---|
| | | | 0.5 mW | 1 mW | 1.5 mW | 2 mW | 0.5 mW | 1 mW | 1.5 mW | 2 mW | |
| Test Sample | 1 | $Co_3O_4$ | 34 | 35 | 35 | 33 | 22 | 23 | 25 | 28 | A |
| | 2 | $Fe_3O_4$ | 38 | 40 | 41 | 40 | 12 | 14 | 17 | 21 | B |
| | 3 | $Fe_2O_3$ | 35 | 36 | 36 | 37 | 13 | 14 | 18 | 20 | B |
| | 4 | NiO | 43 | 44 | 45 | 47 | 15 | 17 | 21 | 22 | B |
| | 5 | $V_2O_5$ | 39 | 40 | 45 | 42 | 14 | 18 | 20 | 21 | B |
| | 6 | $Cr_2O_3$ | 38 | 35 | 38 | 40 | 15 | 18 | 20 | 21 | B |
| | 7 | $MnO_2$ | 38 | 38 | 39 | 38 | 14 | 16 | 18 | 20 | B |
| | 8 | CdS | 36 | 39 | 32 | 37 | 13 | 15 | 16 | 19 | B |
| | 9 | Au—$SiO_2$ | 37 | 38 | 38 | 39 | 15 | 17 | 19 | 21 | B |
| | 10 | Ag—$SiO_2$ | 38 | 39 | 41 | 40 | 14 | 16 | 18 | 22 | B |
| | 11 | Cu—$SiO_2$ | 35 | 36 | 36 | 35 | 16 | 19 | 21 | 23 | B |
| Comparative Reference | 3 | $SiO_2$ | 36 | 35 | 35 | 37 | 2 | 3 | 2 | 4 | C |
| | 4 | No Light-condensing Layer | 37 | 36 | 35 | 37 | 1 | 2 | 2 | 2 | C |

Figure 17:
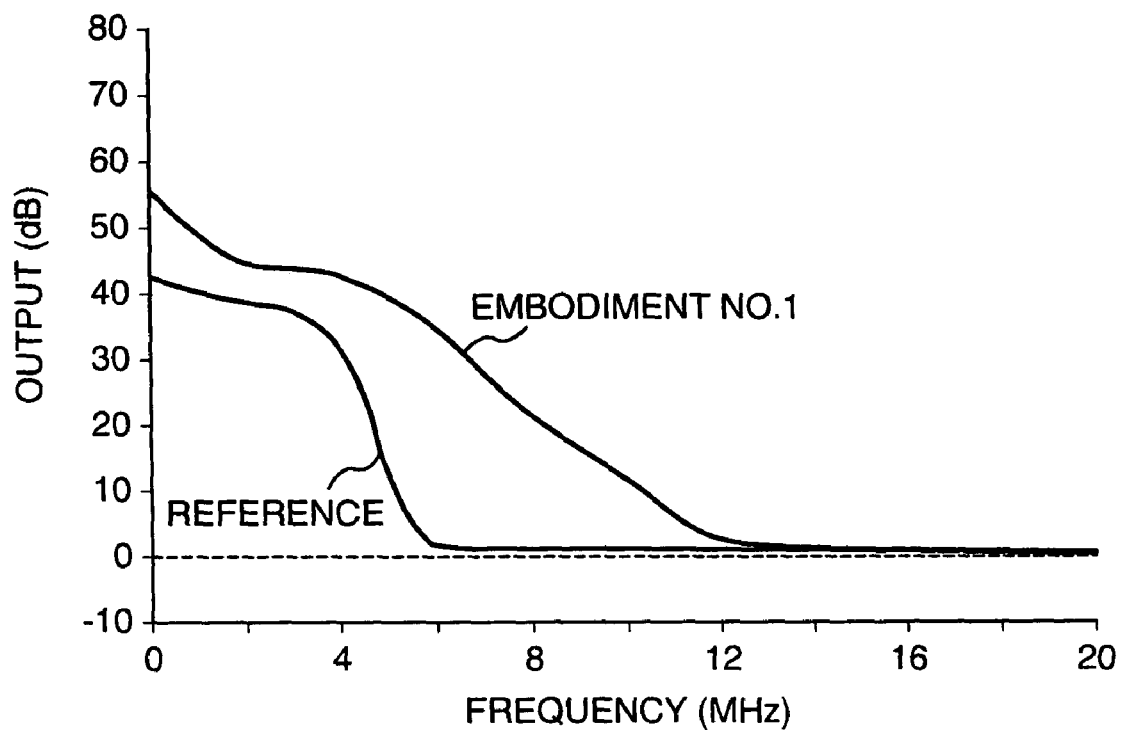
FIG. 17 is a graph showing an output to a signal frequency of the ROM disk produced according to the embodiment of the present invention.

The frequency dependency of the reproducing output characteristic was analyzed by a spectrum analyzer. FIG. 17 shows a measured example of the reproducing output characteristic provided by the spectrum analyzer. FIG. 17 shows the reproducing output characteristics of the disk having a dielectric layer 6 as contained $Co_3O_4$ of the test sample No. 1 in Table 1 and the disk having no light-condensing layer formed thereon. For both of the disks, the reproducing laser power is 1 mW.

In the case of forming the film of the test sample No. 1 as the light-condensing layer, it was assured that the output level is high in the range of a higher frequency component as compared with the comparative reference medium. On the ROM disk, the high-frequency components of the signal are depicted as a more coarse pit pattern. In the case of forming the light-condensing layer, therefore, the more coarse pit pattern is read, reproduced, and outputted. This indicates that the light-condensing effect was obtained in the case of forming the light-condensing layer of the comparative reference example No. 1. This phenomenon is brought about by the change of the refractive index of the light-condensing layer during the radiation of the laser beam.

Figure 12:
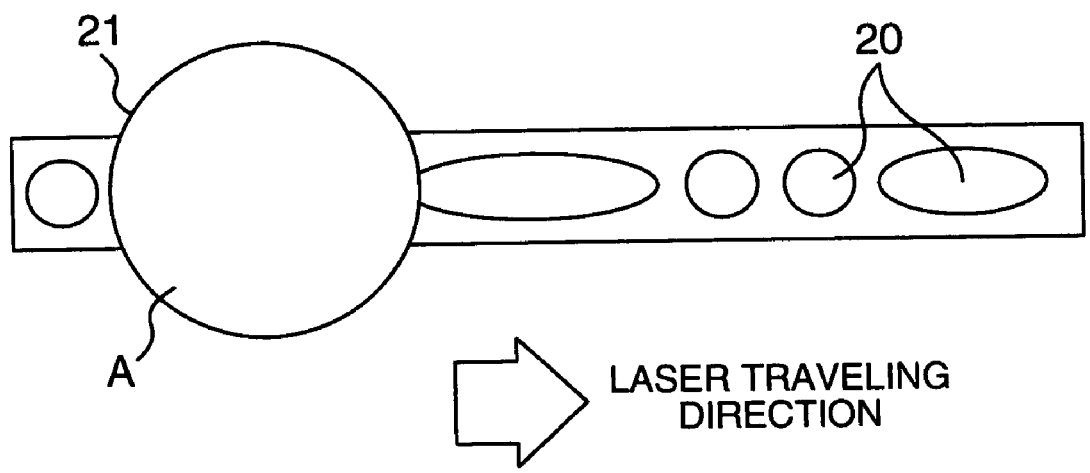
FIG. 12 is a view showing a principle of reproduction with an ordinary laser beam.
Figure 13:
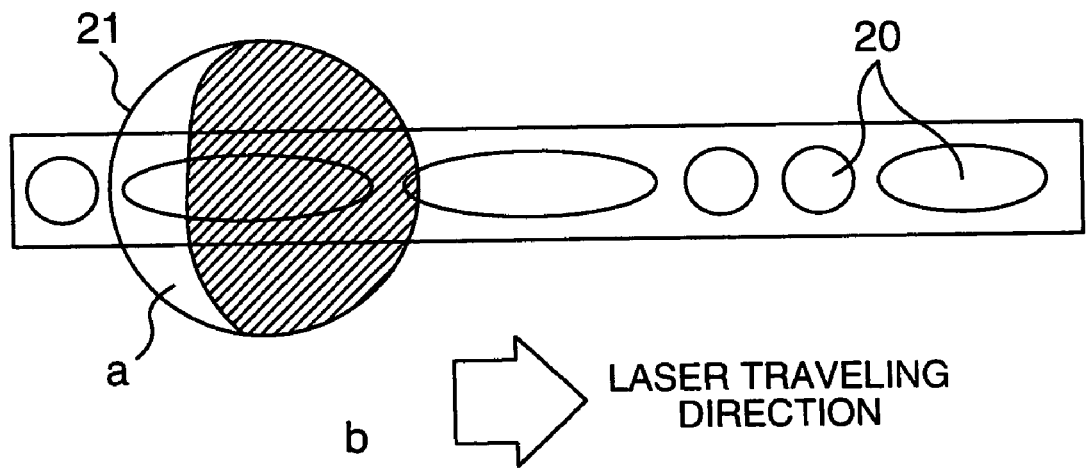
FIG. 13 is a view showing a principle of reproduction in the case of forming the light-condensing layer.

The light-condensing effect brought about by the change of the refractive index will be described in detail with reference to FIGS. 12 and 13. In FIGS. 12 and 13, a numeral 20 denotes a recording pit. A numeral 21 denotes a laser beam. FIG. 12 shows the recording pit pattern and the light volume of the reflected laser beam provided if the optical information recording medium does not include the light-condensing layer 5, while FIG. 12 shows the same provided if the medium includes the layer 5. The laser beam is traveled on the track toward the arrow of FIG. 12 or 13. As shown in FIG. 12, if no light-condensing layer 5 is included, the reflectance is uniform on all the laser-radiated area. Hence, the laser beam is reflected on all area. Hence, the information on the overall laser-radiated area is received at a time. As a result, the pits and the portions except the pits serve to uniformly reflect the laser beam, so that the information from only the pits may be reduced. Hence, the difference of the reflectance between the pit portions and the portions except the pits may be made small. It means that the reproduced signal has an inferior C/N ratio.

On the other hand, consider the reproduction in the case of including the light-condensing layer 5 as shown in FIG. 13 in the optical information recording medium. Since the laser radiation changes the refractive index of the light-condensing layer, in front of the laser-radiated area (b in FIG. 13), the passage of the time is short after the laser is radiated. Hence, this is the area where no refractive index is changed. On the other hand, in back of the laser-radiated area (a in FIG. 13), the passage of the time is long after the laser is radiated. Hence, this is the area where the refractive index is changed. The optical designs such as the refractive index and the thickness of the reflective film and the protective film are adjusted so that the light reflectance may be reduced into an extremely small value in the state of a certain refractive index, which makes it possible to produce a mask area. Considering that the reflectance is made small in the state that no refractive index of the reflective film is changed, no light is reflected from the area b.

In this state, the change of the refractive index of the light-condensing layer causes the foregoing optical designs to be shifted, thereby making the reflectance higher. That is, the laser beam is reflected only on the portion (area a) where the refractive index is changed. In such a state, the area where the reflected ray is returned is made narrower than the area in the case of the ordinary reproduction shown in FIG. 12. Hence, this state allows the signal rays from the pits and from the portions except the pits to be read at an excellent C/N and a high contrast. That is, the change of the refractive index of the light-condensing layer caused by radiating the laser beam brings about the light-condensing effect. As a result, the reproduction of the information from the fine pits is made possible as shown in FIG. 10.

The light-condensing effect in Table 2 was determined as indicated below. The reproducing outputs at 2 MHz or 10 MHz were read from the spectrum shown in FIG. 17. The case that the output at a laser beam intensity of 1 mW and a high frequency signal of 10 MHz is at 20 dB or more was called A. The case that the output is at 13 dB or more to less than 200 dB is called B. In these cases, the light-condensing effect was assured. Further, the case that the output is at less than 8 dB is called C. In this case, the light-condensing effect was not assured.

In the film formed of $Co_3O_4$ of the test sample No. 1, the output at a laser intensity of 1 mW and a high frequency signal of 10 MHz was made to be 13 dB or more to less than 20 dB. The estimated result was B. On the other hand, in the comparative reference examples 1 and 2, though the high output was obtained at the high frequency signal of 2 MHz, the output at the frequency of 10 MHz was not strong, in which case the light-condensing effect was not assured.

From the foregoing description, in a case that the light-condensing layer 5 of the present invention is formed on the ROM type optical disk, the excellent light-condensing effect was obtained. Hence, the optical information recording medium such as a ROM disk having the light-condensing layer 5 of the present invention allowed the information to be read from its fine recording pits with high sensitivity.

Fourth Embodiment

Then, the degrade of the film caused by the repetitive reproductions was studied. The estimation was executed by repetitively radiating a reproducing signal beam onto the RAM disk shown in FIG. 1 and detecting the reproduced output. The laser wavelength was 405 nm and the laser power was 1 mW. The length of the recording mark was 0.2 μm. As the dielectric layer 6 that is one component of the light-condensing layer 5 is used the $Co_3O_4$ film of the test sample No. 1 in Table 1. As a reference example, a phthalocyanine system organic film was selected.

Figure 14:
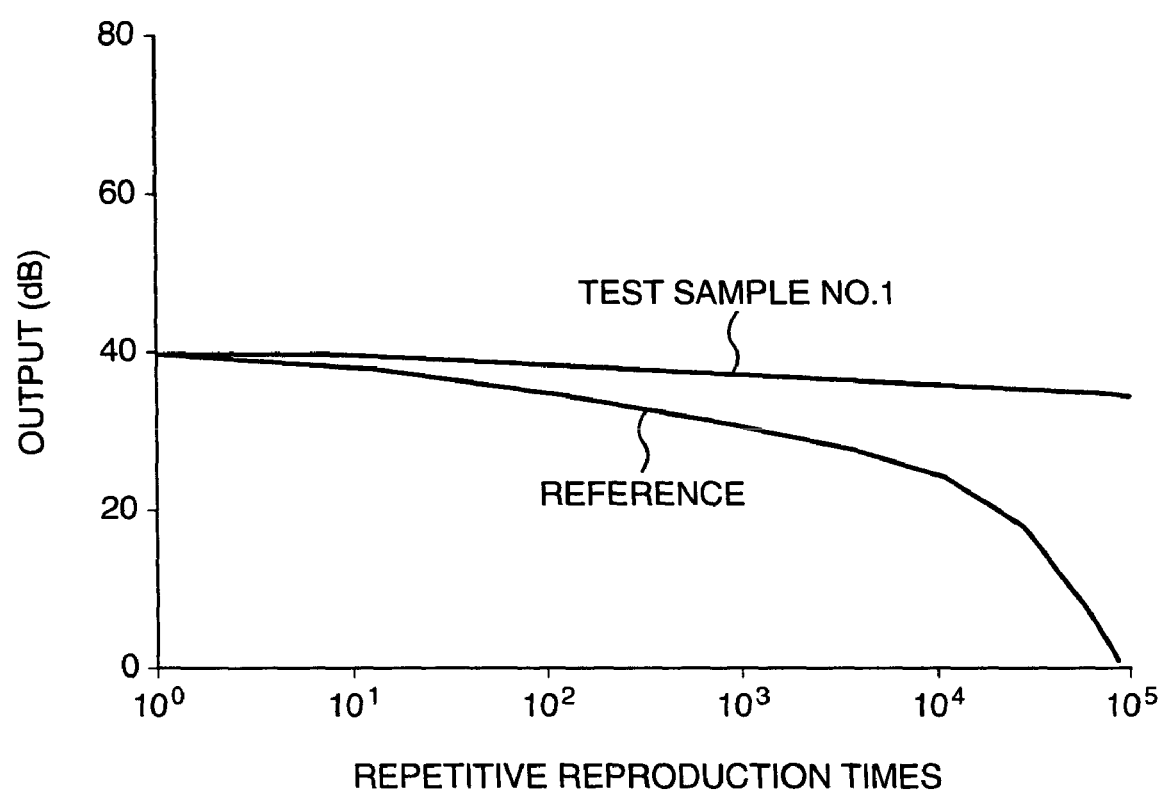
FIG. 14 is a graph showing a degradation of an output to the repetitive reproducing times of the optical disk according to the present invention.

FIG. 14 shows the relation between the output and the repetitive reproducing times. It was understood that the disk with the organic system film formed thereon gradually lowers its output after about $10^4$ repetitive times. On the other hand, the disk with a glass film formed thereon according to the present invention did not substantially lower its output even at a time of $10^5$ repetitive times. As described above, it was assured that the optical disk of this invention keeps the light-condensing effect even if the reproduction is repeated many times. In a case that the film of another one of the test samples Nos. 2 to 11 in Table 1 is used as a glass film, the optical disk enables to keep the high stability to repetitive reproductions.

Then, about the optical disk with the light-condensing layer 5 of the invention, the response speed was studied. The DVD-RAM structure shown in FIG. 1 was created and its mark length had a fixed value of 0.2 μm. The linear speed of the rotation was changed as keeping the reading power at 1 mW. As the dielectric layer 6 having the light-condensing layer 5 formed thereon, the $Co_3O_4$ film of the test sample No. 1 was used.

Figure 15:
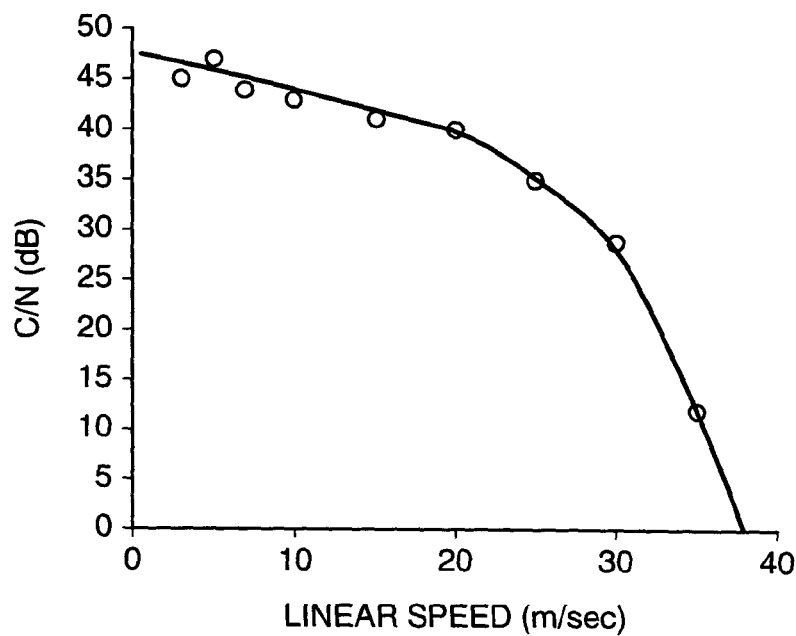
FIG. 15 is a graph showing a change of a C/N ratio to a linear speed of the optical disk provided with the light-condensing layer according to the present invention.

FIG. 15 shows the C/N ratio against the linear speed of the rotation. In the case of using the light-condensing layer 5 according to this embodiment, it was understood that the light-condensing effect is obtained at a linear speed of about 20 m/sec and a high C/N can be obtained. This is because the change of the refractive index of the dielectric layer 6 in the light-condensing layer 5 does not follow the rise of the disk speed so that the difference of the reflectance between the portion where information is recorded and the portion where no information is recorded cannot be sufficiently obtained. As set forth above, in the case of using the light-condensing layer 5 according to the present invention, if the disk rotation speed is 20 m/sec or less, a sufficiently great change of the refractive index takes place, so that a high C/N can be secured. However, when the disk rotation speed exceeds 20 m/sec, the change of the refractive index may not follow the speed, so that the variation of the refractive index is made small. Hence, the light-condensing effect cannot reach the sufficient level.

Fifth Embodiment

Figure 20:
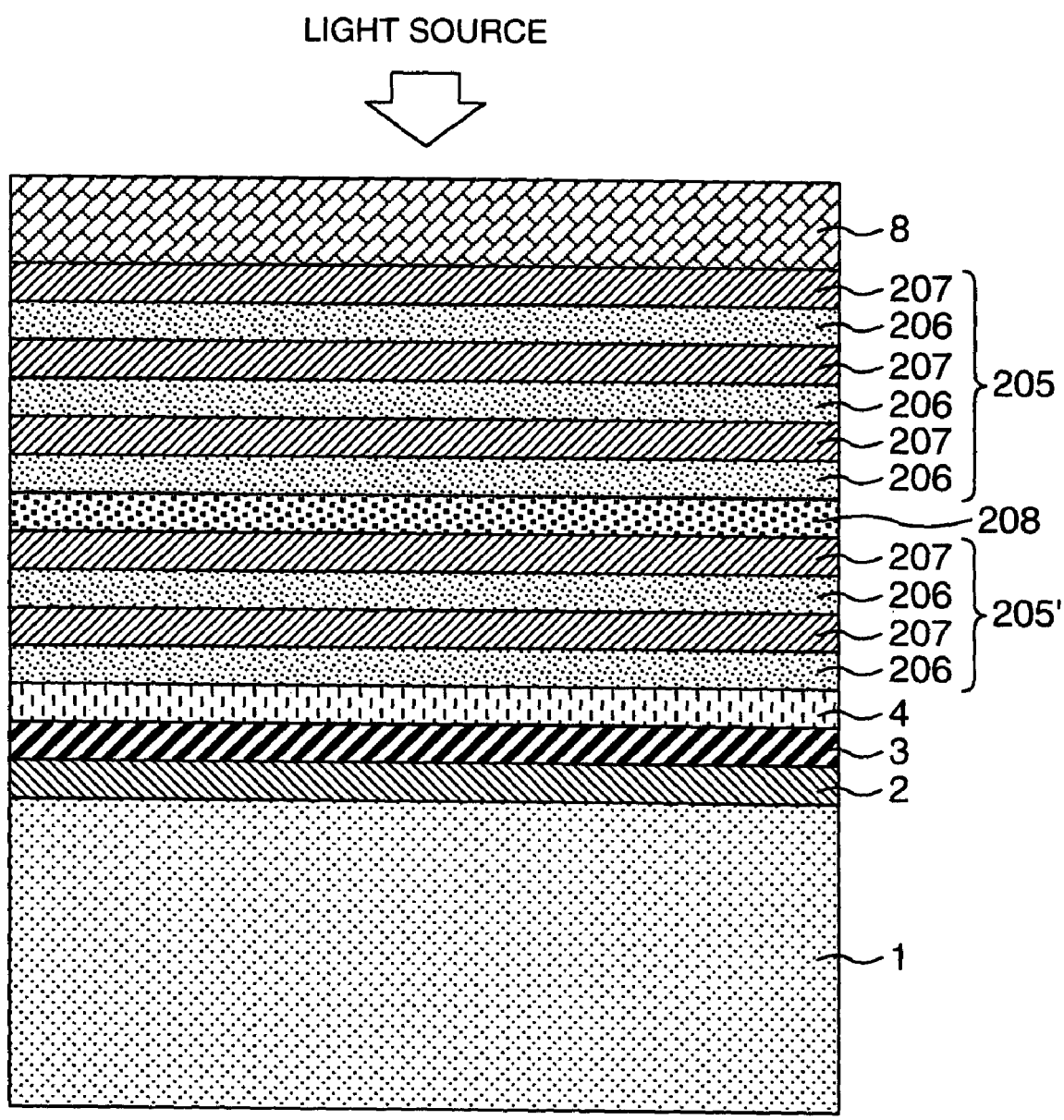
FIG. 20 is a model view showing a sectional structure of the optical disk produced according to the present invention.

The study has been oriented to the optical information recording medium having the light-condensing layer 5 composed to laminate the dielectric layers each formed of a material whose refractive index change is varied by radiating the laser beam. In turn, the description will be oriented to the embodiment in which only one film whose refractive index is changed by the radiated laser is formed in the plurality of laminated dielectric layers. FIG. 20 shows the sectional film composition of the optical disk produced according to this embodiment. In FIG. 20, a numeral 1 denotes a substrate. A numeral 2 denotes a reflective layer. A numeral 3 denotes a protective layer. A numeral 4 denotes a recording layer. A numeral 208 denotes a light-condensing layer whose refractive index change is varied by radiating the laser beam. The light-condensing layer is located between two combinations of laminated layers, each of which is composed of repetitive pairs of dielectric layers 206 and 207. Further, a numeral 8 denotes a cover layer.

In this embodiment, for controlling a reflectance of a blue laser beam of a wavelength of 405 nm, a film of $SiO_2$ whose refractive index is 1.47 was formed as the dielectric layer 206. The film has a thickness of 69 nm. As the dielectric layer 207 was formed a film of $80ZnS$-$20SiO_2$ (mol ratio) whose refractive index is 2.30. The film has a thickness of 44 nm. The other layers such as the reflective layer, the protective layer, and the recording layer were the same as those of the first embodiment. In FIG. 20, the plurality of laminated layers 205 are composed of three cycles of the combination of the dielectric layers 206 and 207. The plurality of laminated layers 205' are composed of two cycles of the combination of these dielectric layers 206 and 207. In actual, as varying the number of the laminating cycles of the plurality of laminated layers in the range of 5 to 30 cycles, the change of the characteristic was studied.

The optical disk having the same film composition as that shown in FIG. 20 was produced. In this optical disk, the number of laminating cycles of each of the pluralities of laminated layers 205 and 205' located on both sides of the light-condensing layer 208 was 10 cycles. About this optical disk, the dependency of the reflectance on the wavelength was checked in the exciting state and the constant state. Herein, the exciting state means the change of the refractive index of the light-condensing layer 208 by radiating a strong laser beam. The constant state means no change of the refractive index of the light-condensing layer 208 by radiating the weak laser beam.

Figure 23:
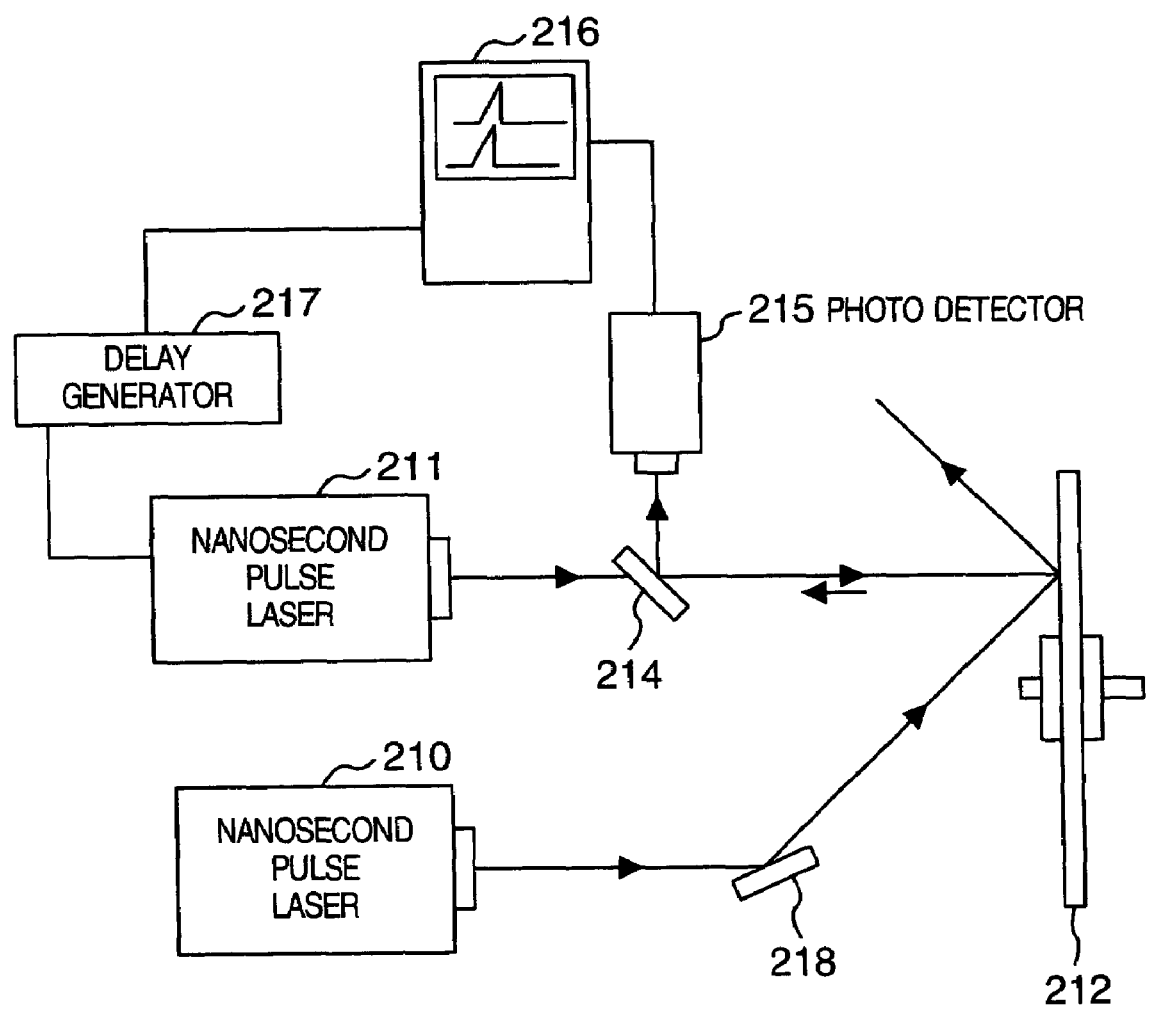
FIG. 23 is a view showing an optical system used for measuring the reflective index shown in FIG. 22.

In order to check the dependency of the reflectance on the wavelength in the exciting state and the constant state, the experiment system as shown in FIG. 23 was produced. In FIG. 23, a numeral 210 denotes a nanosecond pulse laser for excitation. A numeral 211 denotes a nanosecond pulse laser for measurement. A numeral 212 denotes a test sample of an optical disk. A numeral 214 denotes a half mirror. A numeral 215 denotes a photo detector. A numeral 216 denotes an oscilloscope. A numeral 217 denotes a delay generator. A numeral 218 denotes a mirror.

As the nanosecond pulse laser 210 for excitation and the nanosecond pulse laser 211 for measurement was used a YAG-OPO laser provided with a YAG laser beam source for oscillating a 5-ns pulse at a frequency of 20 Hz. The YAG-OPO laser may supply various laser beams having their own wavelengths through a wavelength varying element. The measurable wavelength area was changed from about 300 nm to about 2000 nm. In this experiment, the wavelength of the excitation pulse laser had a fixed wavelength of 405 nm, and the wavelength of the measurement pulse laser was changed from 350 nm to 750 nm. The excitation pulse laser radiated a laser beam at an inclination of 45 degrees against the test sample disk. The measurement pulse laser beam was incident vertically on the area where the excitation laser beam was being radiated. Then, the measurement pulse laser beam was reflected on the half mirror 214 and entered into the photo detector 215. In order to synchronize the measurement pulse laser beam with the excitation pulse laser beam in a pulse occurrence position, the delay generator is provided for making both of the pulse times coincide with each other through the oscilloscope 216.

The reflected light volume of the measurement pulse laser is proportional to the voltage viewed in the oscilloscope 216. Hence, the voltage of this oscilloscope 216 was measured as the reflected light volume. That is, the experiment was executed to measure the reflected light volume of the measuring beam applied when no excitation beam is radiated, scan the wavelength of the measuring laser beam in the range of 350 nm to 750 nm at an interval of 1 nm, and obtain the spectrum of the reflected light volume in the constant state. The similar method was executed to measure the reflected light volume in the case of forming only an aluminum reflective film on the optical disk. The reflected light volume of the optical disk to be tested was normalized with the reflected light volume of the aluminum reflective film, and then the reflectance of the optical disk to be tested was obtained. By measuring the wavelength dependency, the dependency of the reflectance on the wavelength was obtained in the constant state.

Next, by radiating the excitation pulse laser with a wavelength of 405 nm synchronized with the measurement pulse beam and measuring the reflected light volume of the measurement beam in the similar manner, the dependency of the reflectance on the wavelength was obtained in the exciting state. By this, the dependency of the reflectance on the wavelength was measured in the constant state and the exciting state of the optical disk. In this experiment, the pulse laser of a wavelength of 5 ns was used for firing the measurement beam vertically onto the disk. Hence, the nonlinear optical process appearing in the optical disk may be simulatively reproduced.

Figure 21:
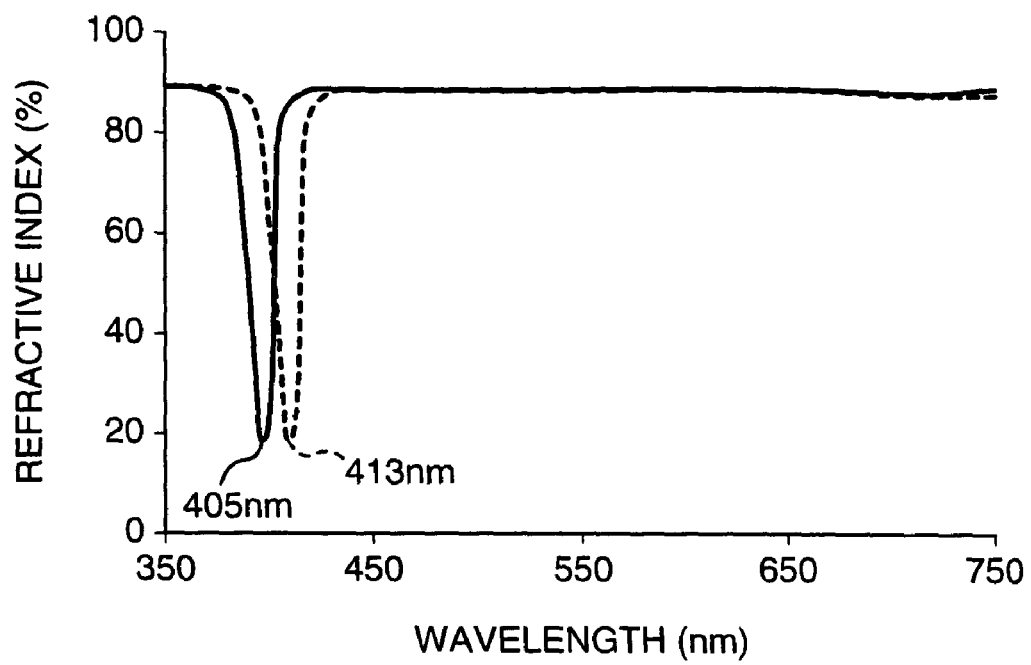
FIG. 21 is a graph showing dependency of a wavelength on a beam reflected on a plurality of laminated layers having the same film structure as the optical disk structure produced according to the present invention shown in FIG. 20.

The dependency of the reflectance on the wavelength is indicated by a real line of FIG. 21. Though the reflectance reaches about 90% over all wavelengths, the beam is absorbed around its wavelength of 405 nm, so that the reflectance is small thereabout (about 20%). Then, the laser beam of a wavelength of 405 nm was radiated onto the area where the white ray is focused and radiated, for checking the change of the reflectance. The change was a profile as indicated by a broken line of FIG. 21. That is, it was found that the absorption peak is shifted around a wavelength of about 413 nm. It was found from the fact that the absorption peak is shifted before and after the radiation of the laser beam of a wavelength of 405 nm and the reflectance was raised from 20% to 72% as focusing attention on the wavelength of 405 nm.

Such an acute wavelength characteristic is a phenomenon taking place as a result of repetitively laminating a combination of layers having respective refractive indexes as shown in FIG. 20 and forming the light-condensing layer 208, that is, a film having a quite different optical characteristic from the laminated layers between the pluralities of laminated layers. This kind of characteristic is determined on the optical constants such as a thickness, a refractive index, and an extinction coefficient of the material. As shown in FIG. 21, for example, in the case of forming the plurality of laminated layers so that the film may reach an absorption peak at a wavelength of 405 nm in the constant state, the refractive index of the light-condensing layer in the exciting state is different from that in the constant state and the film thickness is constant. Hence, the interference condition in the exciting state is different from that in the constant state.

In the graph of FIG. 21, the reflection characteristic is shifted toward the long wavelength. The optical design may be adjusted so that the reflection characteristic may be shifted toward the short wavelength. In such a case, the reflectance is greatly changed if attention is focused on the wavelength of 405 nm. This is a preferable change. It was found that for bringing about such a great change of the reflectance, it is effective to keep the rising angle of the peak 60 degrees or more. In such a case, the difference of the reflectance on a specific wavelength area was so great that the signal resolution may be high, that is, the S/N ratio may be high.

Figure 22:
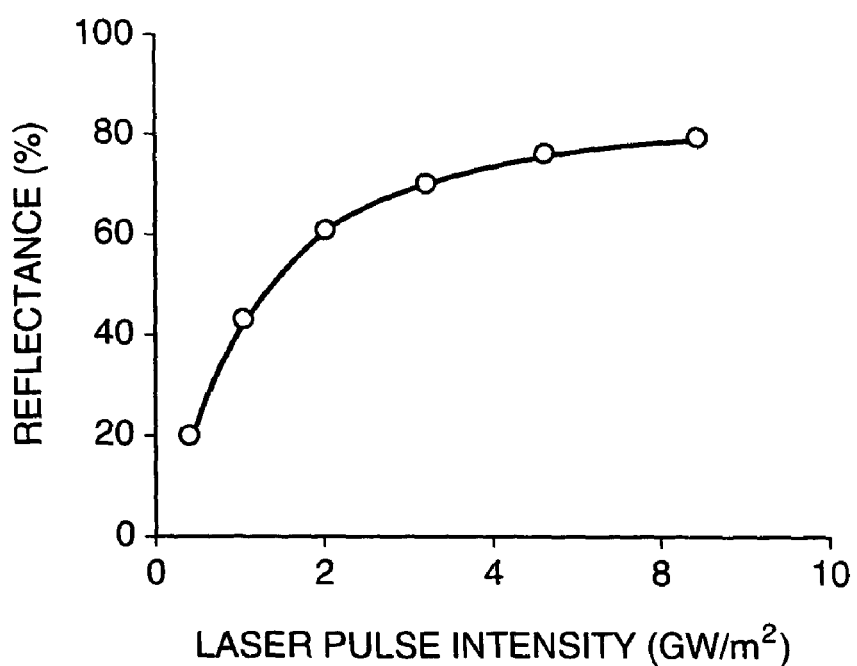
FIG. 22 is a graph showing relation between a laser beam intensity and a reflective index brought about when a laser beam of a wavelength of 405 nm is applied onto the optical disk shown in FIG. 20.

In turn, the optical disk having a film composition as shown in FIG. 20 was produced and the change of the reflectance of the optical disk was checked at a wavelength of 405 nm. The number of revolutions of the disk was 10 m/s. FIG. 22 shows the change of the reflectance against the laser beam intensity. As the laser beam intensity is raising, the reflectance was abruptly raised accordingly. This is because the change shown in FIG. 21 is brought about on the optical disk and the reflectance is increased accordingly.

The C/N ratio to the mark length of this optical disk was measured. In the measurement, it was found that the C/N ratio is made as high as about 40 dB up to a mark length of 0.1 μm and the high-power read and write of the information is made possible even on a more fine mark. In this embodiment, the laminating cycles of the plurality of laminated layers 205 are the same as that of the plurality of laminated layers 205'. As shown in FIG. 20, the number of the laminating cycles is optional in the pluralities of laminated layers 205 and 205', each of which may be individually changed.

The nonlinear optical layer according to the present invention makes it possible to obtain an optical information recording medium of a high recording density and a high S/N ratio.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An optical information recording medium comprising: an optical recording layer formed on a substrate directly or through another layer; a plurality of laminated layers being adjacent to said optical recording layer directly or through another layer; and said plurality of laminated layers being formed by laminating a first and a second dielectric layers twice or more, said first and second dielectric layers having respective refractive indexes against a laser beam used for recording and reading information, the refractive index of each of said first and second dielectric layers being changed reversibly to said laser beam, and the extinction coefficient thereof being lowered reversibly thereto.

2. An optical information recording medium as claimed in claim 1, wherein said first dielectric layer is a film including particles having at least one element selected from a group consisting of Co, Fe, Ni, V, Mn, Cr, Cd, Cu, Ag, Pt and Au, and their oxides or nitrides, and said second dielectric layer is a film including oxide, nitride or sulfide of Si, Ti or Zn.

3. An optical information recording medium as claimed in claim 2, wherein said first dielectric layer includes $Co_3O_4$ and said second dielectric layer includes at least one material selected from a group consisting of $SiO_2$, $TiO_2$, ZnS—SiO2, and $Si_3N_4$.

4. An optical information recording medium as claimed in claim 1, wherein a product of a thickness of said first to third dielectric layers and a refractive index of each layer measured by a laser beam having an intensity of 0.16 $GW/m^2$ or lower is 0.15 to 0.35 time as large as the wavelength of said laser beam.

5. An optical information recording medium comprising: an optical recording layer formed on a substrate directly or through another layer; a plurality of laminated layers being adjacent to said optical recording layer directly or through another layer; a first dielectric layer formed between said optical recording layer and said plurality of laminated layers or in said plurality of laminated layers themselves directly or through another layer; and said plurality of laminated layers being formed by laminating a second and a third dielectric layers having respective refractive indexes against a laser beam used for recording and reading information twice or more, the refractive index of said first dielectric layer being changed reversibly to an intensity of said laser beam, and the extinction coefficient thereof being lowered reversibly thereto.

6. An optical information recording medium as claimed in claim 5, wherein said first dielectric layer is a film including particles having at least one element selected from a group consisting of Co, Fe, Ni, V, Mn, Cr, Cd, Cu, Ag, Pt and Au, and their oxides or nitrides, and said second dielectric layer is a film including oxide, nitride or sulfide of Si, Ti or Zn.

7. An optical information recording medium as claimed in claim 6, wherein said first dielectric layer includes $Co_3O_4$ and said second dielectric layer includes at least one material selected from a group consisting of $SiO_2$, $TiO_2$, ZnS—SiO2, and $Si_3N_4$.

8. An optical information recording medium as claimed in claim 5, wherein a light absorption peak in a spectral reflectance curve is shifted to a longer or a shorter wavelength side than the peak located before a laser beam is radiated.

9. An optical information recording medium as claimed in claim 5, wherein a rising angle of said light absorption peak before and during said laser radiation is at least 60 degrees.

10. An optical information recording apparatus comprising:

an optical information recording medium including an optical recording layer formed on a substrate directly or through another layer, a plurality of laminated layers being adjacent to said optical recording layer directly or through another layer, said plurality of laminated layers being formed by laminating a first and a second dielectric layers twice or more, said first and second dielectric layers having respective refractive indexes against a laser beam used for recording and reading information, the refractive index of said first and second dielectric layers being changed reversibly to an intensity of said laser beam, and the extinction coefficient thereof being lowered reversibly thereto; and an optical pickup for radiating said laser beam onto said optical recording layer, detecting a light volume of said reflected beam, and reading information from said reflected beam.

11. An optical information recording apparatus comprising:

an optical information recording medium including an optical recording layer formed on a substrate directly or through another layer, a first dielectric layer formed between said optical recording layer and said plurality of laminated layers or in said plurality of laminated layers themselves directly or through another layer; and said plurality of laminated layers being formed by laminating a second and a third dielectric layers having respective refractive indexes against a laser beam used for recording and reading information twice or more, the refractive index of said first dielectric layer being changed reversibly to an intensity of said laser beam, and the extinction coefficient thereof being lowered reversibly thereto; and an optical pickup for radiating said optical recording layer, detecting a light volume of said reflected beam, and reading information from said reflected beam.

* * * * *